United States Patent
Osetinsky

(10) Patent No.: US 9,361,806 B2
(45) Date of Patent: Jun. 7, 2016

(54) COMPREHENSION NORMALIZATION

(71) Applicant: Hyperfine, LLC, Philadelphia, PA (US)

(72) Inventor: Bridget Kelly Osetinsky, New York, NY (US)

(73) Assignee: HYPERFINE, LLC, Philadelphia, PA (US)

( * ) Notice: Subject to any disclaimer, the term of this patent is extended or adjusted under 35 U.S.C. 154(b) by 235 days.

(21) Appl. No.: 14/154,151

(22) Filed: Jan. 13, 2014

(65) Prior Publication Data

US 2014/0199666 A1    Jul. 17, 2014

Related U.S. Application Data

(60) Provisional application No. 61/751,957, filed on Jan. 14, 2013.

(51) Int. Cl.
| | | |
|---|---|---|
| *G06F 17/00* | (2006.01) | |
| *G06N 5/00* | (2006.01) | |
| *G09B 5/02* | (2006.01) | |
| *G06N 5/02* | (2006.01) | |

(52) U.S. Cl.
CPC ... *G09B 5/02* (2013.01); *G06N 5/02* (2013.01)

(58) Field of Classification Search
None
See application file for complete search history.

(56) References Cited

U.S. PATENT DOCUMENTS

| | | |
|---|---|---|
| 7,493,252 B1 | 2/2009 | Nagano et al. |
| 2004/0161150 A1 | 8/2004 | Cukierman et al. |
| 2006/0230109 A1* | 10/2006 | Lee ............ G06F 11/0709 709/205 |
| 2007/0038620 A1 | 2/2007 | Ka et al. |
| 2007/0266015 A1 | 11/2007 | Shakib et al. |
| 2008/0016046 A1 | 1/2008 | Guha |
| 2010/0076979 A1 | 3/2010 | Wang et al. |
| 2011/0276607 A1 | 11/2011 | Surna et al. |
| 2012/0072859 A1* | 3/2012 | Wang ............ G06K 9/00442 715/764 |
| 2012/0284199 A1* | 11/2012 | Lundberg ......... G06Q 10/00 705/310 |
| 2013/0254238 A1 | 9/2013 | Yan et al. |
| 2014/0200989 A1 | 7/2014 | Cohen Kassko et al. |

FOREIGN PATENT DOCUMENTS

| | | |
|---|---|---|
| EP | 2755171 | 1/2014 |
| WO | WO 2011/0153171 | 2/2011 |

OTHER PUBLICATIONS

Jiao et al. "An agent-based framework for collaborative negotiation in the global manufacturing supply chain network", Robotics and Computer-Integrated Manufacturing 22 (2006) 239-255.*
Sorg et al. "Cross-lingual Information Retrieval with Explicit Semantic Analysis", CLEF, 2008, pp. 13.*

(Continued)

*Primary Examiner* — Li-Wu Chang
(74) *Attorney, Agent, or Firm* — Patent Capital Group

(57) ABSTRACT

The Comprehension Normalization Method of the present disclosure exploits the differences in the meanings of words or ideas between Big Data sets to build insight. When the comprehension normalization method is performed between two big data sets, both data sets take turns rephrasing the material of the other data set in their own language of understanding. The act of rephrasing a foreign idea connects the data within the set doing the rephrasing in a way it had not been connected before. After two sets take turns rephrasing the data within, both sets will become more connected than ever before and more insightful to the researcher.

48 Claims, 13 Drawing Sheets

(56) References Cited

OTHER PUBLICATIONS

Ladau et al. "Incremental String Comparison", SIAM, 1998, pp. 29.*
European Patent Office Extended Search Report and Written Opinion in EP Application Serial No. 14151168.3 mailed on May 22, 2014.
Jing Peng et al, "CACS: A Novel Classification Algorithm Based on Concept Similarity", Radio Frequency Identification [Lecture Notes in Computer Science], Springer Berlin, Heidelberg, Aug. 6, 2007, (pp. 500-507), XP047179926, ISSN: 0302-9743, ISBN: 978-3-642-45283-3.
Elias Iosif et al., "Unsupervised Semantic Similarity Computation between Terms Using Web Documents", IEEE Transactions on Knowledge and Data Engineering, IEEE Service Center, Los Alamitos, CA, US, vol. 22, No. 11, Nov. 1, 2010 (pp. 1637-1647), XP011296670, ISSN: 1041-4347.
Yang Xiquan et al., "A Concept Similarity Computation Based on Multi-Property Ontology," Software Engineering and Data Mining (SEDM), 2010 2nd International Conference on, IEEE, Piscataway, NJ, USA, Jun. 23, 2010 (pp. 538-543), XP031728065, ISBN: 978-1-4244-7324-3.
Hongzhe Liu et al., "A Novel Vector Space Model for Tree Based Concept Similarity Measurement," Information Management and Engineering (ICIME) 2010, The 2nd IEEE International Conference on, IEEE, Piscataway, NJ, USA, Apr. 16, 2010 (pp. 144-148). XP031684553, ISBN: 978-1-42445263-7.
Serena Sorrentino et al. "Schema Normalization for Improving Schema Matching," Conceptual Modeling, ER 2009, Springer Berlin, Heidelberg, Nov. 9, 2009, (pp. 280-293), XP019132461, ISBN: 978-3-642-04839-5.
Jennifer S. Trueblood et al. "A Quantum Probability Account of Order Effects in Inference," Cognitive Science, vol. 35, No. 8, Sep. 26, 2011 (pp. 1518-1552), XP055114980. ISSN: 03640213, Doi: 10.1111/j.1551-6709.2011.01197.x.
PCT International Search Report and Written Opinion in PCT International Application Serial No. PCT/US2011/038637 mailed on Feb. 17, 2012.
PCT International Preliminary Report on Patentability in PCT International Application Serial No. PCT/US2011/038637 mailed on Dec. 4, 2012.
Bickel, Steffan et al., "Multi-View Clustering," Proceedings of the IEEE International Conference on Data Mining, 2004 (8 pages).
Maderia, Sara C. et al., "Biclustering Algorithms for Biological Data Analysis: A Survey," IEEE Transactions on Computational Biology and Bioinformatics, vol. 1, No. 1, Jan.-Mar. 2004 (22 pages).
Monti, Stefano, "Consensus Clustering, A resampling-based method for class discovery and visualization of gene expression microarray data," Broad Institute/MIT Center for Genome Research, Kluwer Academics Publishers, 2003 (34 pages).
Lawrie, Dawn et al., "Expanding Identifiers to Normalize Source Code Vocabulary," Loyola University Maryland, 2011 27th IEEE International Conference on Software Maintenance (ISCM), (10 pages).
Chaudhuri, Kamalika, "Multi-View Clustering via Canonical Correlation Analysis," Proceedings of the 26th International Conference on Machine Learning, Montreal, Canada, 2009 (8 pages).
Xu, Chang et al., "A Survey on Multi-View Learning," arxiv:1304.5634v1; cs.lg, Apr. 20, 2013 (59 pages).

* cited by examiner (A)

(B)

US 9,361,806 B2

COMPREHENSION NORMALIZATION

PRIORITY DATA

This application is a Non-provisional patent application receiving benefit from U.S. Provisional Patent Application Ser. No. 61/751,957, filed Jan. 14, 2013 and entitled "COMPUTER TOOL FOR GROWING INFORMATION AND NORMALIZING COMPREHENSION OR COMPUTER TOOL FOR PERFORMING THE COMPREHENSION NORMALIZATION METHOD OF COMPARISON WITH DATA", which is hereby incorporated by reference in its entirety.

TECHNICAL FIELD OF THE DISCLOSURE

The disclosure relates generally to computer based research tools in Big Data research and, more particularly, to comparative knowledge extraction and comprehension normalization. The disclosure relates further to a computer tool for growing information and normalizing comprehension, and/or computer tool for performing the comprehension normalization method of comparison with data.

INTRODUCTORY CONCEPTS

The same word can mean different things to different people because each person's understanding of that word is informed by his or her unique life experience. For example, to say the word "daughter," it's just an abstract concept to one person if he doesn't have kids. But if another had a daughter, it might evoke thoughts of love or concern. Big Data is a term that refers to a large amount of data, or a state of data, where the data has gotten so big that different properties are actually usable and apparent. In regular data, words or terms in a data set are not obviously of a language unique to the data set, different from similar other data sets, because when data sets are small, there isn't enough information in a single set to supply a meaning for the entire, unique language. Like if a data set only had three terms in it: Dog; Cat; Dog Food, because the three terms can't supply enough to give Dog, Cat, and Dog Food complete meaning, we have to assume that Dog means the same as what it does in a larger data set, namely the English language properly so called. Data sets have now gotten so big that the same word means different things to different Big Data sets just like the same word means different things to different people. In big data, the data-set's girth of material inside can adequately supply complete meaning to the terms inside, by itself without needing to derive the terms' meanings from a larger data set. In big data, the collection of information housed is so large that a word within a Big Data set gains a unique meaning from the other information within the massive set and that meaning is no longer of a necessary illusion of being standardized across sets.

The Comprehension Normalization Method of the present disclosure exploits the differences in the meanings of words or ideas between Big Data sets to build insight. Data sets had unique meanings for the terms before, but as they were so much smaller, the data set could not supply enough information to let us become aware of what the unique meaning could be, without having to additionally supply definitions to the terms. Now we have a lot of data and a lot of continuing growth of data, so data sets can now let us use the unique meaning. Extracting meaning(s) of term(s) from the data set(s) in Big Data (hereinafter referred to as "comprehension normalization" is not a trivial task. When the comprehension normalization method is performed between two big data sets, both data sets take turns rephrasing the material of the other data set in their own language of understanding. The act of rephrasing a foreign idea connects the data within the set doing the rephrasing in a way it had not been connected before. After two sets take turns rephrasing the data within both sets will become more connected than ever before and more insightful to the researcher.

OVERVIEW

The present disclosure relates generally to using this quality of unique meanings by which data sets gain information by rephrasing which is derivable from Big Data, and practices a computer-based method on inanimate data (non-living and non-organic, but can be dynamic and changing)—referred to herein as a comprehension normalization method based upon insights from human communication and comprehension. The computer-based method, becomes a new comparative method for gaining insight that causes data to become better developed and connected within each autonomous, separate, distinct set.

According to one embodiment, a computer-based tool implementing a comprehension normalization method enables growth of information and insight, through rephrasings, in a fundamentally new way (new from the scientific method and articulated other methods). The comprehension normalization method is a computerized method that adds insight to big data, based on human comprehension normalization that humans do unconsciously as two or more people discuss. However, the non-trivial part is that the computerized method performs a form of comparative knowledge generation and extraction that can only be done by a machine in the context of Big Data. In particular, this form of knowledge extraction is imparted to the computer wherein steps can be performed electronically on aggregated bodies of data to perform this type of knowledge yielding by comparison of insight on the bodies to each other.

The technical task performed by the computer-based tool performs the sort of comparison done by exchanging languages (translating the same information between languages), and grows knowledge extraction using all of the even sometimes conflicting definitions.

DESCRIPTION OF EXAMPLE EMBODIMENTS OF THE DISCLOSURE

Figure 1:
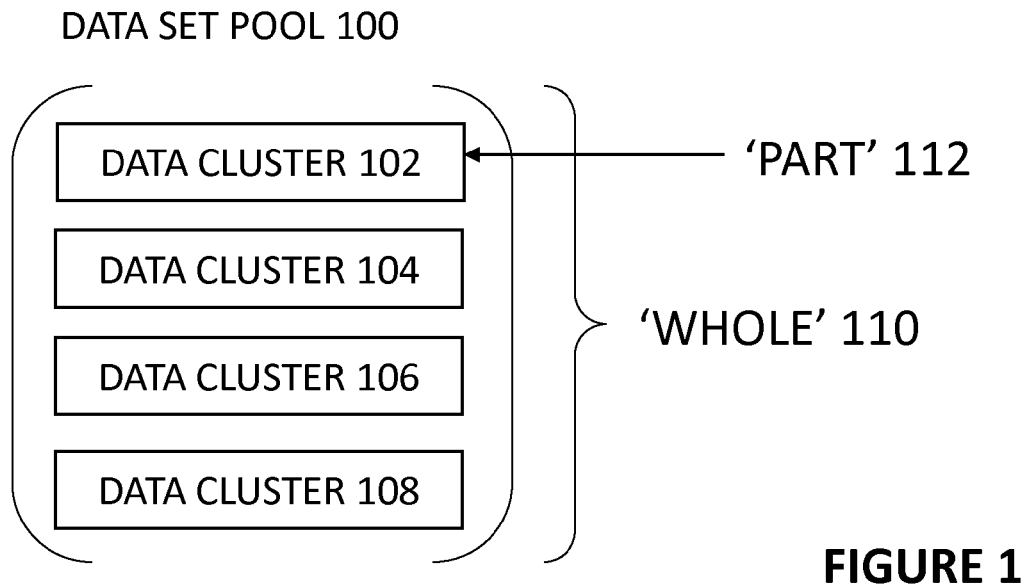
FIG. 1 is a simplified schematic diagram illustrating a pool and its clusters in relation to the phrases "whole" and "part", according to some embodiments of the disclosure.

Comprehension normalization performed by humans is the practice when a person explains something to a listener and the listener, hearing in his own language of comprehension, rephrases it back in his/her own words and they go back and forth until the idea becomes clearer for both people. A professor does it in class when teaching students a concept they have no language familiarity to understand in yet so the picture of the subject the professor draws into the students, will be built from the students' own language of experience and understanding. This translation back and forth builds separate insight in each person.

When comprehension normalization is applied human to human the concept being drawn into the other's understanding gets clearer in both people independently as the concept is rephrased back and forth from the speaker's language, to the listener's language, to the speaker's language. On the basis of this idea and revelation, the present disclosure describes methods and systems for applying the concept of comprehension normalization to big data using a computer-based tool, recreating a human form of comprehension in the virtual environment.

Special Thing Being Connected

Humans practice this comprehension method with other people, and between a person and inanimate (non-alive, e.g. a book) material like the subject of an image or written text. Because data sets were so small before, it was not apparent that inanimate (non-living) information could perform the comprehension normalization method of re-characterizing another's information, with another piece of inanimate (non-living) information. Characterizing or rephrasing between two languages of inanimate (non-living) information forms a new comparative method, which unlike the scientific method does not derive its value from isolating and comparing variables against normals and subtracting to see differences, but rather derives its value by using the reflection of putting something in the language of the other, to find new things and connections within itself. Autonomously, this powerful comparative method makes each comparative data set more connected within itself.

When this was performed in a way requiring an animate player (sentient living person), it was not a comparative method because there were not two or more things separate from the observer being compared. Using it between two pieces of inanimate (non-living) information was not possible because data sets were too small. Now we are in the world of big data, so now it can be a new way of comparing to gain insight.

The embodiments disclosed herein performs the comprehension normalization method in/with/by a computer system between big data sets (wherein the computer system comprises one or more processors configured to process data stored in one or more non-transient data storage volumes).

How Having Different Vocabularies Changes What we can do with Data

Currently data is compared by combining nodes. Nodes are where data is connected in relationships. The nodes, or relationships, are combined into places where there is a common aspect of a joint with a relationship in one data set, and that aspect of a joint without a relationship in another set. If there are connections in one and there are commonalities across to connections in another, they are combined through the commonalities to form the bigger more connected total. That is done because if data sets are interpreted as being in the same language, a connection that is true in one should also be true in another. Generally this is still true. It's just not the end of what we can do with it now. It is easy to come up with a scenario where a relationship true in one set wouldn't be true in another. Usually the cause of the relationship not being true is because it is in a different context. Extrapolating that we are working with data so big, that what in small data would have been subtle differences, can now actually be an entirely different context onto itself like two different sets with petabytes of data each. Considering the two data sets as separate languages, then even terms that typically have been considered transferable between the two sets, will be considered of a different total language context and non-transferable without collateral rephrasing. You can extract information on the truth of information about an idea based on how it is seen differently in the two languages of the sets. The disparity in context of understanding can actually show the researcher a new angle of truth on the term in a way making both data sets more connected within itself, and that is the intended purpose for this tool.

The embodiments disclosed herein is a tool for performing the comprehension normalization method, data set-to-data set, so data sets can [crystallize comprehension, or language meaning with other data sets (similar to the results achieved by people)] connect the data within itself in a way it had not been connected before. The comprehension normalization method performed here between two information sources separate from the person who is conducting the comparison, becomes now a comparative method. The tool enables one data set to perform the process of, rephrasing an idea from another language into its own language, which extracts insight by reflecting the differences in usages of terms making data more connected within their own autonomous sets/selves.

Not Even Translatable into the Same Language

The currently practiced method of combining nodes is expressive that the two comparing terms are in the same language or, can be made to exist in the same language with a simple translation of one of them, but that they are heterochthonous. Heterochthonous (from the Greek heter meaning different and chthonous meaning earth) can mean two things being comprised of entirely different substance and of a fundamentally different core and different guiding rules, two things that cannot be made to exist in the other, and/or two things that are different to the fullest extent. The tool described here acknowledges not only that there can be different definitions between sets but also that that difference is not merely a simple translation, but instead one that requires the participation of a whole set to derive its meaning, just like a word in an individual's personal vocabulary may harbor conflicting emotional or historical descriptions. In order to utilize Big Data's separate languages, then like an individual, Big Data sets should most appropriately form their unique understanding of incoming terms from the whole set's information. Using the entire set, the unique definition of a term derives its meaning from multiple and sometimes even competing definitions. That is why a very unusual use of dualities in a way kind of reflective of elements of quantum mechanics is used here.

Set-Up

To visualize the data, in the description of the tool most clearly, visualize the data sets are in the form of pools of data collected by commonalities, like the pool collecting over 'patient electronic medical records (EMR) on congestive heart failure,' or collecting a pool with 'medical literature on antibiotics.' The pools just described are then able to be organized into the measures that exist in the pool under a measurement. The antibiotic pool described above could be clustered to the measurement: 'side effects'—and it would form clusters around subcategories of the measure side effects, like: 'blurry eyes,' 'weight loss,' 'rash,' 'confusion,' 'nausea,' and 'drowsiness' and these clusters of side effects will have in them, pieces of the pool's data with the relevant side effect in it.

The generation of a pool can be done using vertical search, and clusters can be generated using horizontal search. These concepts are described separately and in combination in US patent application publication no. US2013/0275404, having the same inventor as this present application, entitled "Data isolating research tool" (filed on May 31, 2011 and published on Oct. 17, 2013), which is hereby incorporated by reference in its entirety. A skilled person in the art would appreciate that the combination of vertical search and horizontal search would generate the pools and clusters (a term related to parts) as describe herein, to serve as a starting data set as input to the comprehension normalization method.

Another example is a pool, gathered by the commonality 'German shepherds', which is broken down by the measure 'heights.' Example visualization methods could be, a user would see the data clustered into the variety of 'heights' reflected across the data of the pool. This is not the only way data can be for the tool to work, but as a running example—that, pool broken down by a metric/measurement—is an easy formation for the tool to use the data in (and is one automated by the technology in patent application publication US2013/0275404 (also referred to above). Comprehension normalization method comparison done in this form will be between one pool and another pool or more. That is, the comprehension normalization method aims to compare between pools by a use of rephrasing—to extract meanings that are based on the pool as a whole. A second purpose is to normalize the meaning across the pools by putting any number of data sets into the language of understanding of one data set, such that the pools and their respective clusters can be compared properly (more apples-to-apples) by the scientific method. Most typically, the data set pools being compared will be clustered by the same measurement when the intention is to later or before, perform comparison by normals and variables, but Comprehension Normalization can be very informative with different measurements of breakdown as much as with same measurements. The words 'pool' and 'data set' are being used fairly interchangeably.

Parameter Choice on the Specificity of Horizontal Cluster Unit (or 'Part') Breakdown of a Whole or Pool (e.g. Significant Digits or Other of Choosing)

When the unit being using in the comprehension normalization is generated by such as the horizontal, the thing generating it has the option of parameterizing to bigger or smaller units of specificity/division. The thing breaking it down, like the horizontal search engine, can have a choose-able function, that allows the computer, or the researcher, to vary the specificity and number of resulting breakdown clusters/parts. For some research it may be desirable to have very precise extensive division between otherwise very closely related things, and in other research it may be more desirable to have broader divisions that enjoy fewer and much larger units.

Additionally parameters can be chosen that regulates the inclusion of a piece of information into one of the clusters (or parts) (see smallest unit discussion for qualifications that can be assumed for defining "piece of information"). For example, if a collection of data of literature on drugs, is broken down by drug metabolic profile (smallest unit being by drug) then perhaps it could include something that can be chosen by the user or researcher (or the computer—e.g. automatically depending on the diversity within the data) that regulates the percentage of the total of a given smallest unit that must contain the trait being broken down by, for the unit to be included also within that part. For drug metabolic profile, from the pool all literature on drugs, there is likely information on almost all of the drugs (at least one article etc.) that claim the drug has a metabolic side effect of weight gain, and weight neutral, and weight loss. Letting a drug be included in a part (here the parts are those three metabolic profiles) simply by one mention of the different profiles would be non-useful, and the researcher would be much better off if only drugs that had at least 2% of the mentions of that drug, were to be included in a part. There are other times, there researcher wants to look at the very fine distinctions and will want every mention of a certain result to count, in that case the researcher would parameterize the inclusion by much greater sensitivity.

Parts and Wholes

The tool does its preparation (as said before) by putting data into pools and holding a breakdown under a measurement. Consider each subcategory of the measurement, also known as each measure (or each cluster) under the breakdown as a 'Part.' And everything in the pool as 'Whole.'

FIG. 1 is a simplified schematic diagram illustrating a pool and its clusters in relation to the phrases "whole" and "part", according to some embodiments of the disclosure. As seen in the diagram, data set pool 100, e.g., generated using vertical search, comprises a plurality of data clusters 102, 104, 106, and 108, e.g., generated using horizontal search within the data set pool 100. Each of the data clusters 102, 104, 106, and 108 may be referred to as a 'part' 112, and the data set pool 100 may be referred to as a 'whole' 110. Parts can be generated by other than the horizontal search function, a part can be broken by units of words, sentences, paragraphs, or any other breakdown too.

Unit Locking

In developing the units of choice for using with the comprehension normalization method, it is possible that a few layers of the vertical and horizontal from the patent application (US2013/0275404) previously mentioned, will be used to perform the research with multi-layer analysis. Unit locking, is, when during the course of multi-layer analysis, a unit from one layer is chosen to be the smallest possible unit for all future breakups but other horizontals. For example, if within a study of pharmaceutical medication the researcher decides, the smallest unit should be drug wide. This makes what is in a single drug and indivisible unit and any cluster resulting in some part of the drug must have the whole drug. If mechanisms of action is the next measurement by the horizontal, two mechanisms of a single drug cannot be divided from each other. In this patent this is called unit locking. It can be done at any level, either by requiring a given breakdown by the horizontal to be the smallest divisible unit in all further analysis, or by requiring a parameter of your choice (like sentences or words or paragraphs) to be the smallest possible unit for either the next layer, a number of layers, and all further analysis.

Comparing Parts and Wholes

Figure 2:
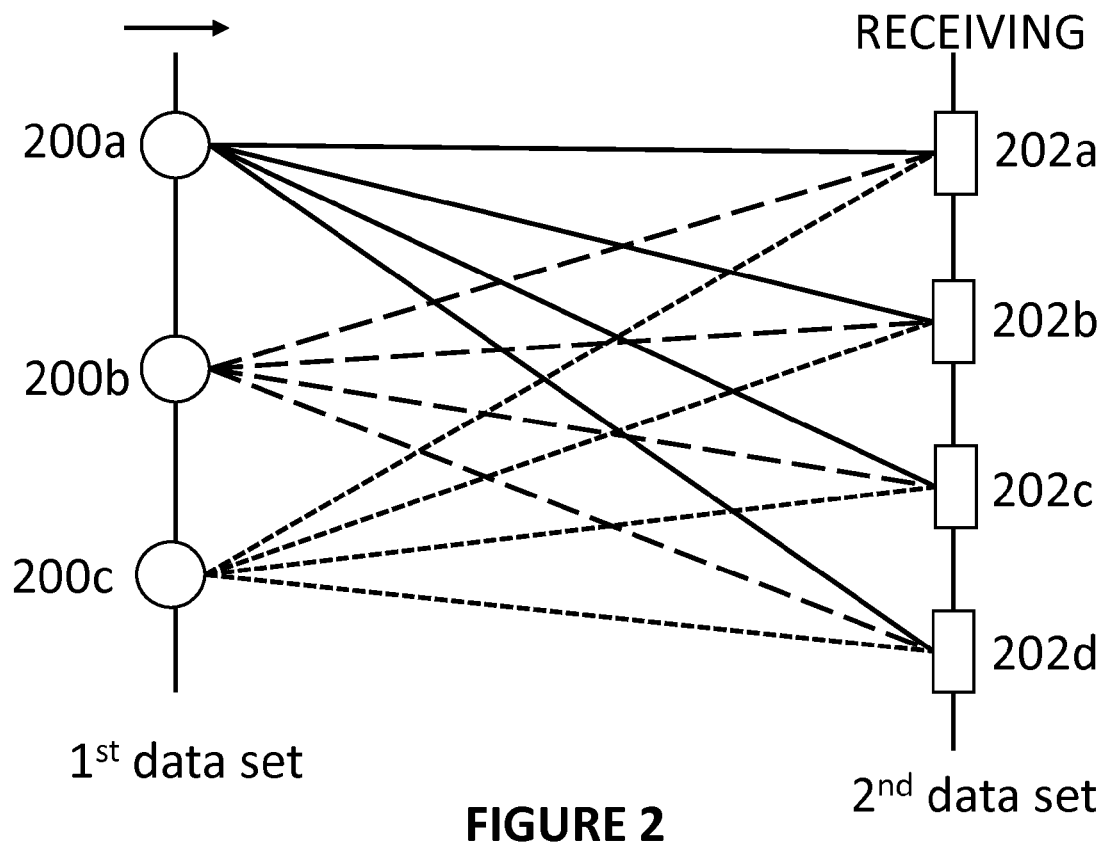
FIG. 2 is a simplified schematic diagram illustrating comparing parts and wholes, according to some embodiments of the disclosure.

FIG. 2 is a simplified schematic diagram illustrating comparing parts and wholes, according to some embodiments of the disclosure. The circles 200a-c represent 'parts' of a first data set, i.e., a first 'whole', and the rectangles 202a-d represent 'parts' of a second data set, i.e., a second 'whole'. FIG. 2 illustrates parts from the first data set are each going to every part, i.e., the whole of the second data set.

The tool does the comprehension normalization method by going through the material in each of first data set's 'Parts' and compares that material inside the 'Part' with the second data set's 'Whole.' The material inside the 'Part' is the data, and the words/material inside that data part, of one measure of the measurement, is the data in one cluster or other unit of breakdown such as sentence, paragraphs, articles, or page. Inside each one of the parts the computer is looking for resonance with anything in the entire 'Whole' of the other data set in the comparison. There are many ways of finding "resonance" such as using keywords, or semantic rules.

The material being communicated from one data set to the other as it is between the two languages, is the idea within held by the 'Whole,' housed by the way the first data set is broken down into its 'Parts.' The concept translated from the first data set into the second data set is the way first data set is broken down under its measurement. This first data set can be either side of the comparison, but breakdown of the first one being compared IS the idea being translated. After the second data set has rephrased the first data set's idea, the first data set will then be translating the rephrasing. The first rephrases the rephrasing by the second. This back and forth process may continue on until a condition is met.

When the second data set is used to rephrase the first, the second data set then translates its interpretation of the first data set's breakdown. The second data set is broken down into segments that are the segments representing each one of the first data set's original 'Parts' not how the second set would break down under the measurement unaltered, but what plural 'Parts' or single 'Part' of the second data set, contain portions of material related with the material inside one 'Part' of the first data set. When something in the 'Whole' of the second data set has a level of resonance, a relation, or similarity (measured through techniques discussed in the body of this patent) with a 'Part' of first data set, the second data set (the second) will divide into its 'Parts' but 'Parts' representing each 'Part' of first data set's breakdown, which could be groups of multiple clusters under the metric from second data set.

Instead in order to compare and contrast the second data set's unique individual breakdown under the measurement, the computer starts with the second data set, and breaks the second data set into 'Parts' (parts 202a, 202b, 202c, and 202d) under the measurement and looks for resonance for each 'Part' of second data set (as shown by the lines connecting the parts in the first data set and the parts in the second data set), with any 'Parts' (200a, 200b, and 200c) in the 'Whole' of first data set. This time, the first data set's return breakdown is first data set's rephrasing of, second data set under the measurement, and the breakdown into 'Parts' will be which grouping of the first data set's 'Parts' have resonance with one 'Part' of second data set. As with what happened starting with the first data set, the first data set is broken down into the grouping of 'Parts' that represent one of the second data set's 'Part.' Several in a group may form the representation of the single 'Part' of second data set's and temporarily the way first data set will be broken down into 'Parts' will be the grouping that houses each single one of the second data set's 'Parts' and temporarily the first data set breaks down into the 'Parts' that correspond to the breakdown into 'Parts' of the second data set under the measurement.

This comparing (by way of using semantic rules, logic, or keywords, seeking similarities or seeking things like differences, seeking commonalities by different parameters etc.) of data set one's individual 'Parts' with the other's 'Whole' (or vice-versa) connects data in a way utilizing the different definitions under the two data sets. When one data set rephrases the material of the other big data set, by using different ones of its own parts, it, in rephrasing, becomes connected differently than its set had ever been connected before. The fact of different definitions is true even over the same word/term; i.e. just because two data sets have the same measure (cluster heading, terms) inside them doesn't mean they are defined the same way but rather are always considered to be potentially unique. With the differences in how words and information are used, the data sets' phrasing and rephrasing of an idea (first data set's break down under the measurement), in a reflective pattern, causes reconnection and extraction of knowledge based on these new connections, by allowing the latter set, to use the previous's understanding and alternate word choice to see new things when retranslated by itself.

Figure 3:
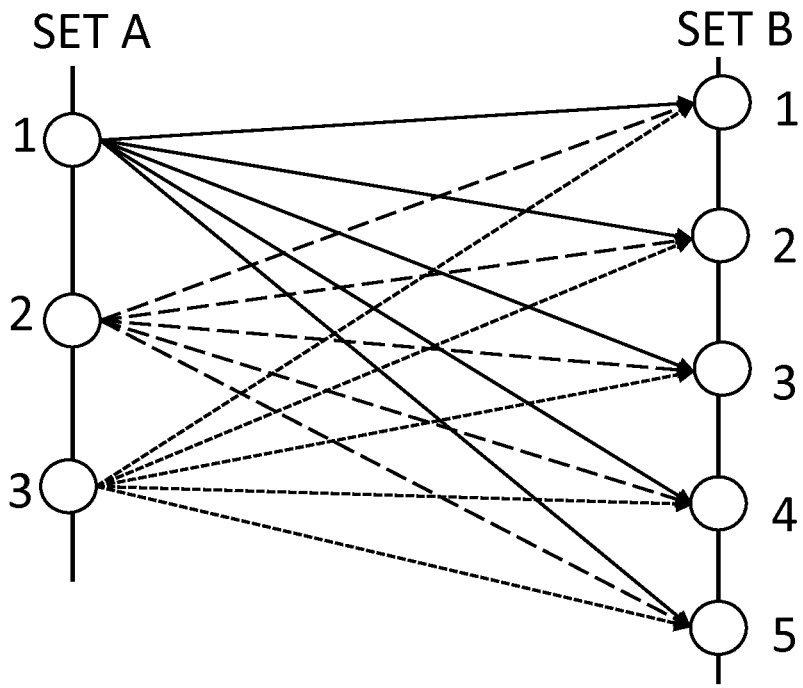
FIG. 3 is a simplified schematic diagram illustrating comparing parts and wholes in a reflexive pattern, according to some embodiments of the disclosure.
Figure 3:
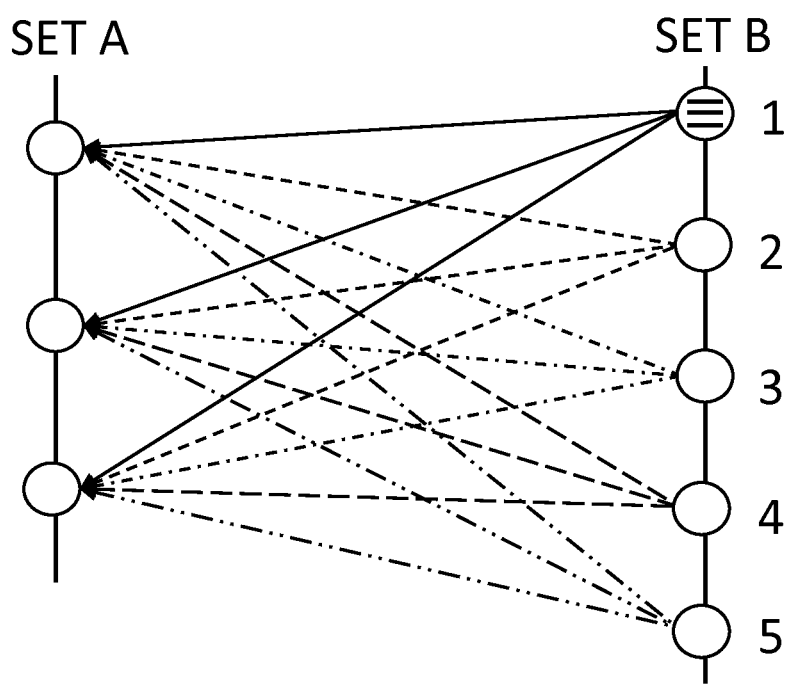

FIG. 3 is a simplified schematic diagram illustrating comparing parts and wholes starting from set A or starting from set B, in a reflexive pattern (part (A) of the figure shows starting with set A going to set B; part (B) of the figure shows starting with set B going to set A), causing rephrasing, where the whole of the receiving set receives is what receives each part of the sending set according to some embodiments of the disclosure. The Parts-Whole process or tool successfully allows using multiple competing definitions to work together. Specifically, FIG. 3 shows the formatting of the interaction of data to build a tool to conduct this comprehension normalization and extraction. By taking the 'Part' of one data set, and comparing to the 'Whole' of the other, the tool successfully uses the multiple natures that can exist. For example when a pool of data represented under a variable and broken down by heights, if the first (or any) possible height looks for resonant relation within all the information in the possible heights of second data set, then multiple possible heights can all play an influence in how second data set will rephrase or understand data set one's part. This retaining of pluralistic influences through reflecting the information of the data sets in this Parts-Whole way allows the potential for multiple rounds of new information from the same comparisons repeated over and over until the depth of the information expires, before a new comparison is generated. The tool performing this method allows for the creation of information in a way separate from the scientific method.

Science

Figure 4:
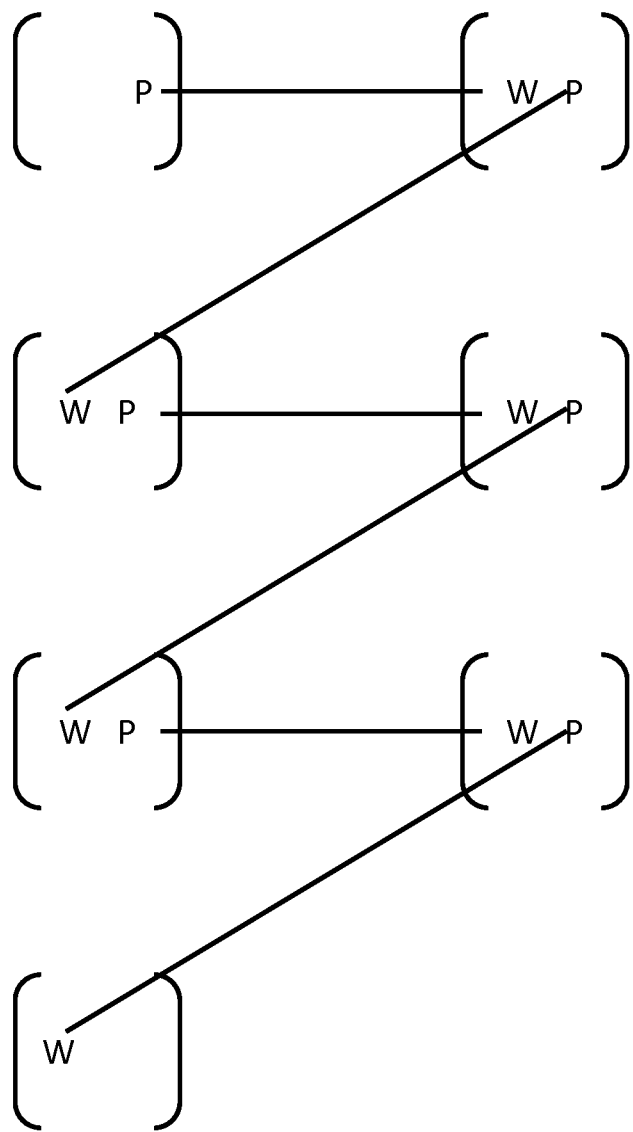
FIG. 4 is a simplified schematic diagram illustrating the part-whole duality, according to some embodiments of the disclosure.

FIG. 4 is a simplified schematic diagram illustrating the part-whole duality, according to some embodiments of the disclosure. In the Figure, P stands for Part (or particle) or discrete, W stands for Whole (or wave) or continuous. A duality in all things is, that it can be seen as discrete or continuous; discrete meaning of segregate ingredient parts or continuous meaning as a combined whole.

How it Works-Formulary

This is a patent for a tool to perform comparison, normalize language, and extract knowledge. The tool can work by using (as an example), data that has been placed into two or more pools and broken down within the pools as desired for the particular comparison. With each set viewable by 'Whole' (the whole pool/data set) and 'Parts' (breakdown under the measurement) the program will normalize comprehension and extract knowledge by comparing each 'Part' of one data set with the 'Whole' of the other, followed by each 'Part' of, first data set as reexpressed by second data set's parts (i.e. the collection of the second data set's parts that together best rephrases or resonates with the one part of the first data set), with the 'Whole' of first data set. This continues back and forth for the length of time it takes to return no new information and this will depend on the complexity and relevance of the data sets to each other.

After the second data set has been used to rephrase the first data set, the parts the first's whole will be receiving are the parts made up of groups of the second data set's parts that together rephrase one part of the first data set's. The first data set looks at the second data set and sees its original information (or breakdown) in terms possessed by the second data set. So when the collection of the second data set's parts goes back (translating back to the terminology of the first data set), it is still sending the idea stemming from first data set, just this time in different terms, the terms from second data set, expressing the first data set's idea.

Figure 5:
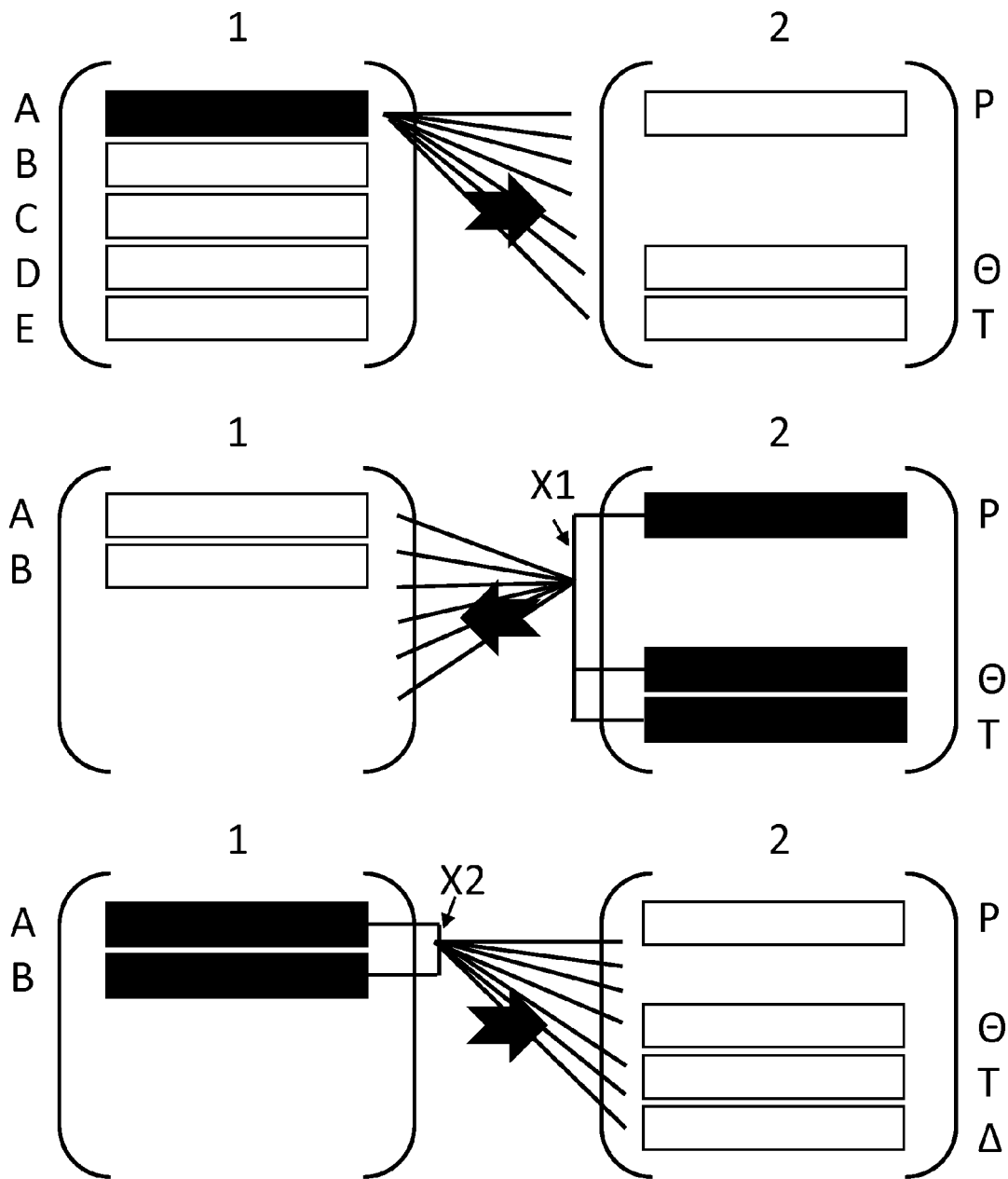
FIG. 5 is a simplified schematic diagram illustrating comprehension normalization being performed on one part of a whole; according to some embodiments of the disclosure.

FIG. 5 is a simplified schematic diagram illustrating comprehension normalization being performed on one part of a whole; according to some embodiments of the disclosure. Specifically, FIG. 5 depicts the back and forth that would happen over one 'Part' (labeled as "A") of the first data set. The first data set (labeled as "1") is shown illustratively as having five parts "A", "B", "C", "D", and "E"). It is understood that the same comprehension normalization would be taking place on all or some of the other 'Parts' ("B", "C", "D", and "E") in like fashion.

By the time each one of the first data set's 'Parts' have been reconstituted behind different terms, the terms are again definite, defined by how they have been apportioned under the combined measures of second data set (labeled as "2"). It ends up with a series of the first data set 'Parts' now all temporarily in the form of potentially multiple second data set 'Parts' ("P", "Θ", "T"). When the second data set "2" having the "Parts" (grouped and combined, as "X1") rebuilds this again back into the first data set, what is being built is not the second data set's several unaltered original 'Parts', but rather what is being retranslated by the first data set will be what the first data set's parts look like in the second data set. There will be an overlapping where some of the 'Parts' from the second data set's breakdown under the measurement will be used in potentially many groups of 'Parts' that reconstitute the first data set's different, and singular 'Parts'. A single part under the second data set's original unaltered breakdown of its own measurement may serve as resonant in more than one 'Part' from first data set (e.g., "A" and "B"). 'Parts' within the receiving 'Whole' can be reused so all are available for all of first data set's 'Parts' and some may be used by themselves or in groups, more than one time.

Once the meaning has been transferred into second data set's language, and the second data set has broken down into new parts, where each of the new parts is made out of the many original parts that together restate the first data set's part in question, the rephrasing (new parts) can be re-sent (grouped and combined as "X1"), back to be received by the whole of the first data set. Each one of the second data set's new parts making the rephrasing will be compared with the whole of the first data set, so if 'Part' A of first data set meant 4 'Parts' of second data set, the four parts together are called the new part (grouped and combined), and the new part is what looks for resonance in all of the first data set to be retranslated back into the first data set's language.

The first data set will not adopt or highlight or connect to anything of the second data set's but just like the first time, will see where the meaning of those new parts are reflected within itself.

The second data set's new breakdown into the new parts comprised of many unaltered parts of the second data set connects the material in the second set in a way it had not been connected before (connecting the parts in the second set resonating with the part "A" to each other, e.g., the parts "P", "Θ", and "T"). The first data set also breaks down into new parts (e.g., part "A" and part "B"), each made of the many original parts that together best restate the material inside one of the second data set's new parts, and in doing this rephrasing of a foreign expression, the first data set's new parts also connect the first data set's material differently than it had been connected before (connecting the parts in the first set resonating with the part "X1" to each other, e.g., the parts "A" and "B"). Continuing, then the second set's whole receives the first data set's newly created parts ("X2"), e.g., "X2" combining "A" and "B" seeks resonance with each part of the second data set. Once again the second data set is reconnected differently in performing the rephrasing of the first data set's rephrasing of the second data set's rephrasing. Because the first data set's newly created parts rephrasing the second data set's rephrasing may have been different from the original first data set's parts, when resonance is found with the whole of the second data set, the breakdown of newly created parts might be different for rephrasing the first data set's newly created parts, than for rephrasing the original parts (e.g., "P", "Θ", "T" versus "P", "Θ", "T" and "Δ", or "Θ", "T" versus "P", "Θ", "T" and "Δ", etc.). In this way, depending on the complexity and relevance of the data, it is possible that the same action— the rephrasing—can be performed for a very large number of times back and forth generating new information each time.

At some point it will eventually reach a temporary saturation resulting in no more new information until the data sets are modified somehow and the comprehension normalization method can produce new insight again. The result at the end (end meaning saturation, or desired point e.g. 20 times, or 50% saturation, etc.) is a lot of connections. The final newly created part on one end will probably be comprised of a great many of the original parts. The original parts may have been broken by article, sentence, concept, etc., and now there is a large collection of them that are now connected with each other. This new collection could be used as a pool in further study by multi-layer analysis by the scientific method, with another pool (perhaps comprised of the new collection held by the other newly created part). Part of the clue to the nature of this new collection can be found in what the collection is rephrasing (i.e. what is in the final newly created part of the other data set that this collection in question is rephrasing). The nature of what it is rephrasing can say something very important about the connection binding the collection. Sometimes that which comprises the collection, when later analysis is conducted, means something new when seen in the context of the rest of the collection.

When the whole receives a part, it searches for different desired styles of resonance through each of its 'Parts' until it has compared the information in that 'Part' with the entire "Whole" of it. For example, if we are looking under the collected pool called 'antibiotics' and having it organized under the measurement here measuring 'side effects' the pool 'antibiotics' will be broken into clusters of things such as data exhibiting rashes, data exhibiting drowsiness, data exhibiting weight gain, data exhibiting memory loss etc. Each data clustering around one measure of the measurement as a total cluster (i.e. 'Part') is being compared as the 'Part' in our comparison. Because this is Big Data, the information housed within a cluster or 'Part' will not likely be simple, but can be rather large itself and really complex.

Figure 6:
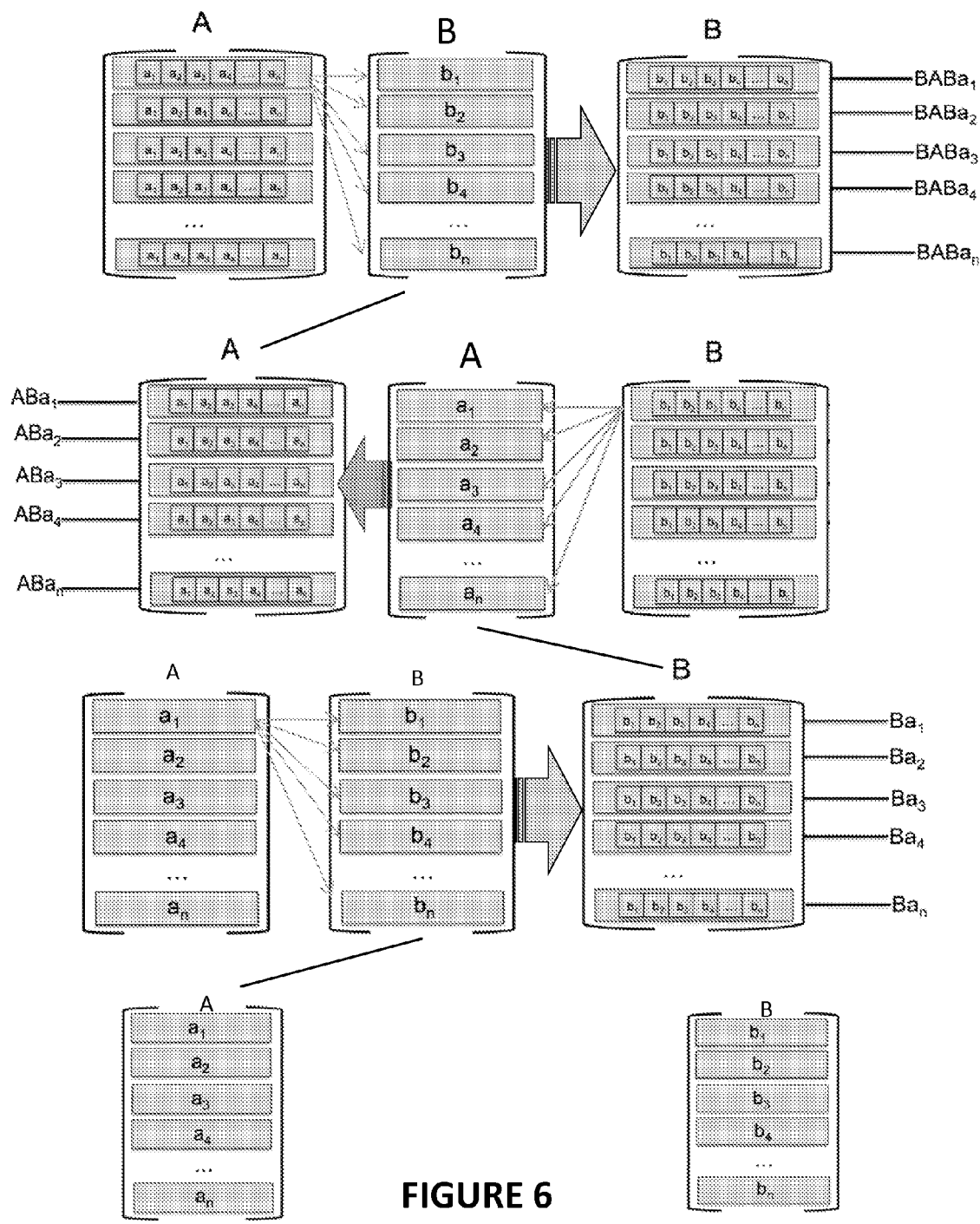
FIG. 6 is a simplified schematic diagram illustrating comprehension normalization between data set A and data set B, according to some embodiments of the disclosure.

FIG. 6 depict simplified schematic diagrams illustrating comprehension normalization between data set A and data set B, according to some embodiments of the disclosure. Regarding FIG. 6, the schematic diagram shows displays two data sets (A and B).—can be applied to translate the material in A, into the language of B, then the A expressed by B back into A again, etc. and vice versa. This FIGURE shows that the transitions are the 'Part' of one to the 'Whole' of the other or seen otherwise the 'Whole' of the one to the 'Parts' of the other.

Here are Data Set pool A and Data set pool B, broken down by the metric containing submetrics (or parts), a1, a2, a3 . . . and b1, b2, and b3 . . . respectively. In this example the A is compared with B. A sequence shows original A's subsets being understood by the metric answers in terms of B's and, e.g., resulting that a1 could find resonance with b1, b2 and b5. After this comparison A is seen in cords of B. After this, A's B (chord) per each part a1, a2 —this cord—now looks for resonance in the whole of A again.

If starting from the other side (not depicted here), then we perform the same operation with B and we find where B's metric subsets are called up in different cords of A and in one example b1 is retranslated by the parts a2 and a3 and so the transformed B will be contained in writing by b1 'Part' in terms of A 'Whole' followed by b2 'Part' in terms of A 'Whole,' b3 'Part' in terms of A 'Whole' etc. (i.e., b1 part rephrased as the part comprised of a2 and a3, b2 part rephrased as the part comprised of a1 and a4, b3 part rephrased as the part comprised of a2, a3, a4, etc.).

Returning to our A-initiated comparing (as depicted), the result of A, the new parts of A (i.e. the transformed A into A' as expanded by B's understanding of A). And so here a first original part, sub metric, like metric answer 'NY' that has been expanded to include that which is in NY, OK, and MA. And then, in sending its parts back over into B the new part comprised of [NY, OK, and MA] finds relations to itself from the whole of B. This then would be taken back to be compared on A original again if desired (this can go on as long as is productive) and this expanded, expanded, expanded subsets will see how they draw different or more from A original.

The left's B's can start first and then transform their subsets the same way as the A's did just now we are changing B.

Figure 7:
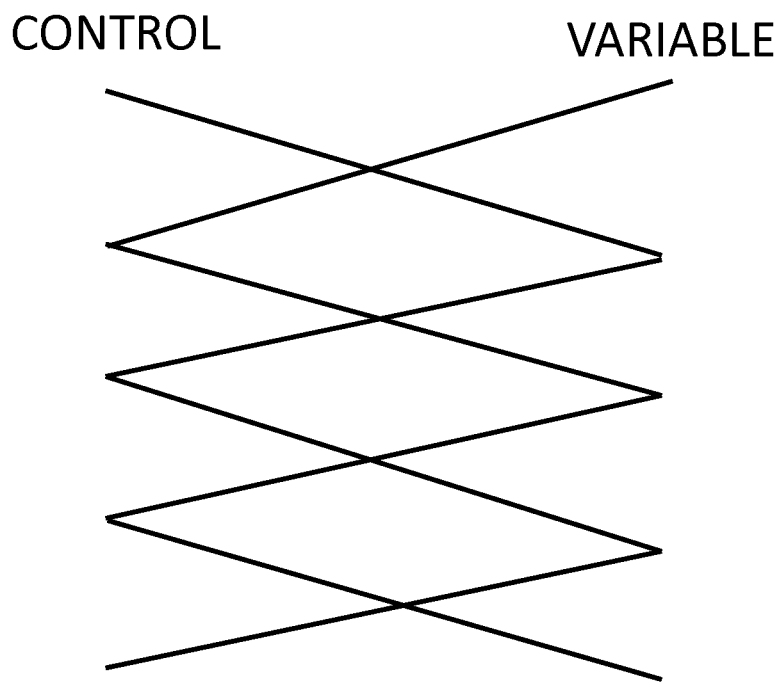
FIG. 7 is a simplified schematic diagram illustrating the possible ordering (e.g., performing before scientific method, or performing after, but performing in conjunction) according to some embodiments of the disclosure.

FIG. 7 is a simplified schematic diagram illustrating the comprehension normalization's being performed in conjunction with the scientific method, either before or after, according to some embodiments of the disclosure. This shows where this back and forth comparing expansion coordinates with performing analysis by the scientific method. Here it is performed first, in a manner where after comprehension normalization is performed, the language of either one is picked for both, allowing the variable and the control to be in the same language as each other to compare by the scientific method. Although the comprehension normalizing is good on its own to bring knowledge, this can be used in the context of the scientific method by concluding it with the subtraction of the variable and control to find differences, isolated to the variable.

Methods of Finding Resonance

Resonance as the term is used here is when the 'Part' of one data set is partially or fully (or in another way) represented by a/some 'Part(s)' within the 'Whole' of the other. By a parameter resonance could be looking for commonalities, opposites, fragments, some form of relationship that is parameterizable. Resonance can be found using semantic rules that try to figure out the actual meaning of the sentence(s) or material, and then look for meaning similarities with the other data set's 'Parts.' It could also be that resonance is found by using any same word within a 'Part' being compared to another 'Part' in the 'Whole' of the other. It could also be something like, same two words within 5 spaces of each other. There are numerous, numerous configurations deeming how resonance is computationally established as resonance required here, but generally it is the process of some sort of searching, or recognition algorithm applied 'Part' to 'Whole' to look for resonance from the 'Part' of one to the 'Part(s)' of the 'Whole' of the other.

Different resonance can cause both additive and subtractive. The new rephrasing of the other side may cause an original part to be taken away from the collection of parts that taken together rephrase the part of the other set, or can cause an addition of more parts into the new collection of parts which taken together rephrase the part.

Methods of Preserving Conclusions

After a couple rounds of 'Parts'-'Whole' reflecting translating the breakdown of first data set, or alternatively translating the breakdown of the second data set, the intent is that it will help the original data set (the side we started on) find new information through its own connections within itself. The result may look like, a part on one side is rephrased by a number of the original parts on the other side. The parts that are part of the rephrasing are now in a connection to each other. Connections via comprehension normalization are not made by connections across to the other data set. Though it can be done in conjunction with that if desired. What comprehension normalization generates are new connections inside of itself, i.e. inside the individual data set in one part of the comparison. The result therefore are a new set of connections, across the original data, as generated throughout by its rephrasing of another set (even by rephrasing another set that was rephrasing the original data set itself, hence when it rephrases that, the connections across itself show the influence of another perspective reading it.) Nonetheless, it was doing rephrasing of another set, (whether it is rephrasing anything else, or rephrasing a different perspective of its own ideas), that causes new connections across itself are identified. One way of preserving these connections within itself, is say, if measure clusters A, B, and C eventually are all shown to be related, using software to label to record the new connections with simple or complex markers of the connections.

These could be stored, or labeled, as a special sort of connection that is only used when the computer makes the connection as per Comprehension Normalization with another set, or it could be stored particularly describing (for the computer for future connections), the more nuanced description of the type of connection conveyed in that particular joining across original 'Parts.' Like storing the sentence or such that inspired the connection between two parts of one set as the description/title/type of that connection, so A with B (of set one) are now connected with the phrase "XXX" which can be something within second data set, within a 'Part' of second data set, or even is a 'Part' of a plural of data sets as the label for how the connection and connection type are stored.

Alternatively, sentences causing connections like this can be stored as a class of other sentence connections like it also, (i.e., if the connection between A and B came from a negative in the sentence stemming from data set 2, then the connection between A and B (or within material of 'Part' A and Part 'B,' or within material of 'Part' A to within 'Part' A, etc.) is preserved by the class-negative). They can be stored as key words from the thing in second data set inspiring the connection. They can be stored as the term/measure/cluster name of the 'Part' of data set two under second data set's breakdown within which was material that inspired/induced the connection in first data set. They can be stored under the term/measure/cluster name of the original 'Part' from first data set under first data set's breakdown that the inducing group in second data set (second data set under first data set's breakdown) is originally reflected/translated from.

Connections Between What, that are being Used or Stored

The connections within the autonomous sets of data can be made across 'Parts' connecting a 'Part' of first data set to another 'Part' of first data set's. They can be made across the individual data within the 'Part' and another 'Part,' and/or another individual data in another 'Part' and/or another individual piece of data in the same 'Part.' It can also make the connections relying on groups of data (e.g. if it was A and B together that were needed together to inspire the thing in data set 2 to inspire the thing in first data set C then the unit AB can be connected to C (as per the phrase/class/term connecting them if desired). Connections between something and a group, the group can again be a group of 'Parts' it can be a group of data in a 'Part' or the group of data across 'Parts' (and any combination otherwise).

Other Things that Could Create Parts Besides Holding a Breakdown Under a Measurement To the question what is a 'Part,' it is really any breakdown of the data set from its combined together whole to discrete components comprising the data set. Discrete components may be big or small, as small as a word for example or as big as several petabytes for another example. Because this tool will mostly be used with Big Data, it is expected that a 'Part' might have a little girth to it, and the tool works better when the 'Part' does. But answers might become more traditional to what humans think of as rephrasing, when the rephrasing is done by a smaller unit like a sentence. It is also interesting to have discrepancy between the size of the average part between the sets; one set broken down by paragraphs, and the other (and to be final) set by sentences, etc. A horizontal search engine that clusters data is an easy way of segregating the set into 'Parts' in an automated fashion. A part can really be anything discrete (e.g. with components) from big to small, from numbers to paragraphs, from pixels to groups of images, parts of speech, categories, etc. and there are more than hundreds of mechanisms that can be used to break something up into 'Parts'.

'Pick a Language'—Comprehension Normalization for Normalizing Language to a Language in Common In addition to being used as a comparative method for generating new connections, the comprehension normalization can secondarily be used to choose a language and cause all of the data sets to become comparable under the chosen language. To choose a language, the results of the connections become "locked" in a sense, and retagged as the label they are rephrasing. Then further research is conducted using this new breakdown of the parts, and these new phrases for what is inside it. One language is chosen, and the other data set, after comprehension normalization, is given the other data sets parts' names, the names of the part the new clusters are rephrasing. Once they are labeled by the same language, they can be compared, by normal scientific method hypothesis testing via controls and variables, and other comparative research that can be improved by things being in the same language.

To adopt the language of another data set, parts which finds resonance with an intermediate data set (i.e., a part or parts in the other data set) can gain a new label from the other data set. This allows another data set to change the way the original data set is organized into parts. These data sets which finds resonance (resonating parts) with a part or parts in the other data set can be grouped together as a new part. This new part can adopt a label or name which corresponds to the part or parts in the other data set (e.g., label describing the concept being grouped by the part or parts). This is because the label or name of the part or parts in the other data set should explain the concepts unifying or connecting the resonating parts. This new label of the new part allows the resonating parts as a group to adopt the language of the other data set. This new part can also be used for further iterations of comprehension normalization, if desired (see the following section on "Gradation").

Resonating parts can exist at various stages of comprehension normalization, which is an iterative, reflexive process. At each iteration, the original part which started the comprehension normalization or an intermediate data set would find resonance in one or more resonating parts. In other words, (different) resonating parts can be present after one iteration of comprehension normalization, or more, or at the point of saturation, where the resonating parts have stabilized. Note that the resonating parts used for generating a new part may or may not come from resonating parts at the state of saturation. It is further noted that these new parts can be added to the original whole for further iterations of comprehension normalization.

For example, if a pharmaceutical company wanted to pool the result from two different experiments' data, and count up certain combined numbers, or take two experiments to compare numbers, they would want the numbers to be in the same language, to have the same things under their title. For example, if one data set uses the word adverse events (as the label of the part) and means heart attacks and death, that is different from the set that uses the word adverse events (as its label for the part) and means side effects, discontinuation, heart attacks, stroke and death. After comprehension normalization is run to the level the company desires it to be run, adverse events from one side is chosen as the definition of adverse events, and to have the title adverse events the other side would have to include parts that rephrase what is in adverse events, not its own way of using that term. It is even possible that the term didn't even have to exist at all in the other set as the name of a part, if a group of parts rephrases it, then those parts are then relabeled by the title of the definition on the other side. Also they could be renamed by anything derived from the title and definition on the other side. It is possible that the one side could use a series of parts to add to the broader definition of adverse events, or that, if broken down smaller, the data set could isolate only to parts that build up only the narrow use of the adverse events. Then the numbers for adverse events can accurately be compared across the two sets on a large scale. This is something that would otherwise be near impossible in its time commitment it would take to do when being done on Big Data.

Gradation

The locking, or relabeling by the other data set's part titles can also be done in preparation for further comprehension normalization, in order to develop or grow a set towards being in a language that can interact with something that it originally had not commonalities to. By way of locking-relabeling a set can adopt a different vocabulary to become more developed towards an unrelated language. Within the part, i.e. underneath the new label is the data sets original definitions and material. The title is also now part of the material within the part, so the adopted vocabulary will call up the part it now labels, when the other data set is searching for resonance. One way to make sure the comparative method works to its best is to compare data sets in a graduated (locking-relabeled) manner towards the language with no commonalities. For example, a human does this when a student who is completely fresh faced to a topic, may start with a book that is half in the language of the student's life and half (a very introduction) in the language of the new topic. If the student starts with that book, he builds into himself (his data set) a skeleton structure vocabulary of that topic over his own experiences, so when he finally reads a book that is more in the language of the new topic, the unfamiliar language will have things to latch onto so the back and forth results in new learning for both sets. When the Comprehension Normalization Method is performed by a computer and both parties are inanimate (non-alive but can be moving/changing/developing), it is still helpful to work up in a graduated fashion from two data sets in totally dissimilar fields and usages of terms. This concept is further illustrated in an example shown in FIGS. 9J and 9K.

Figure 8:
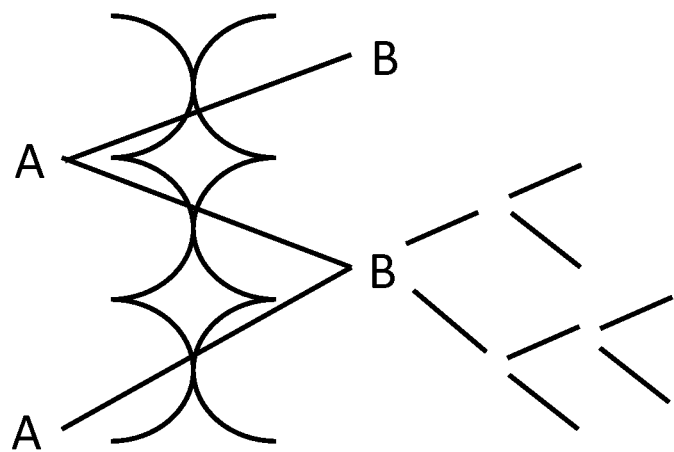
FIG. 8 is a simplified schematic diagram illustrating added information coming to a comparison from any preceding comparisons, according to some embodiments of the disclosure.

FIG. 8 is a simplified schematic diagram illustrating added information coming to a comparison from any preceding comparisons, according to some embodiments of the disclosure. The image in FIG. 8 represents the added information coming to a comparison from any preceding comparisons (like as through graduated-ly building up to a comparison). In this image, when data set A is translated into the language of data set B, data set B in bringing with its set, all of the previous manipulations that have occurred to it because of previous comparisons.

Illustrative Example of Comprehension Normalization

Figure 9A:
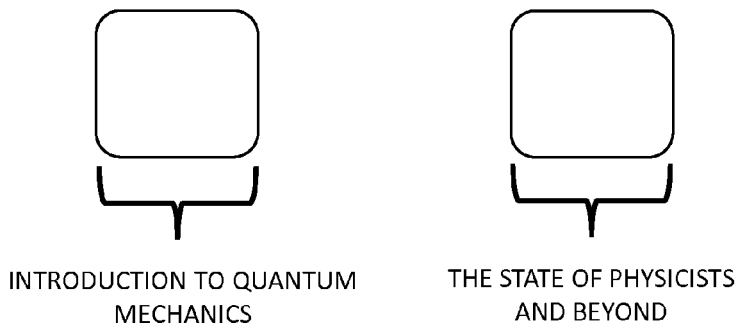
FIGS. 9A-L are simplified schematic diagrams illustrating comprehension normalization being performed until saturation, according to some embodiments of the disclosure.

FIGS. 9A-L are simplified schematic diagrams illustrating comprehension normalization being performed until saturation, according to some embodiments of the disclosure. FIG. 9A portrays two different data sources that are going to be used for their language. These could have been chosen through using the vertical search function or any other way. Here our two languages in the extended example are going to be a fictitious book called Introduction to Quantum Mechanics and another fictitious book called The State of Physicists and Beyond. One of these books cover the topics taught in Quantum Mechanics and the other contains biographies blended with the physics descriptions.

Figure 9B:
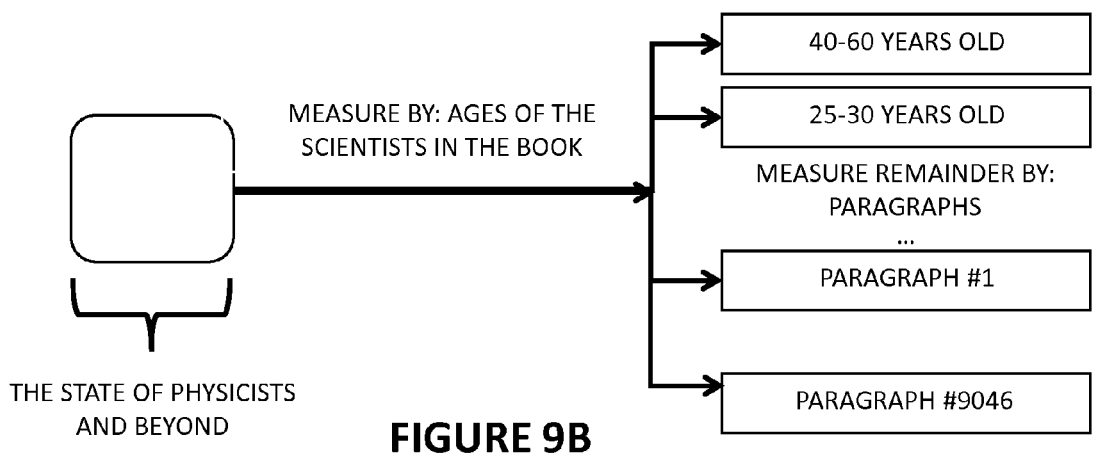

FIG. 9B portrays one of the datasets—The State of Physicists and Beyond data set being broken down into the units of building blocks it will build the rephrasing of the other data set from. In this case it will be broken down by ages, ages of the physicists in the book. For brevity, very broad clusters are the resultant measures. In reality there can be an option within the mechanism doing the measuring—in this case most likely the horizontal search function—which will give the researcher the capacity to choose broadness or specificity of the clusters. Another option may be used that allows the researcher to group certain clusters into units of breakdown that they desire. This point in the research problem could be many layers deep into it; there can be an additional option incorporated into this that "Locks" the units. Locking the units would mean that the clusters will be the smallest breakdown any further measurement can divide the results by. For example if the researcher measured a pool collected through a vertical search function of Scholarly Literature of Drugs, by the measurement: Drugs, and then locked the unit. Then in the next measurement which will recluster the data by something such as mechanisms of action, the smallest unit or cluster in the mechanisms of action must include a complete drug and would therefore never be only one of the mechanisms of action in a drug involving many mechanisms but rather would include the mechanisms of the complete drug. In this example we are going to have locked the unit at "paragraphs." The smallest unit under any breakdown of further measurement will never include less than a full paragraph. In this example the data in the book has been grouped by paragraph into the two age clusters. In this example there are remainder data that does not fall into this measurement. The program can be designed to let the researcher chose the unit for breaking the remaining data up by. This could be page or chapter or topic, but in this example we are clustering the remaining unclustered data by paragraph. In this example there are 9046 paragraphs of the remainder.

Figure 9C:
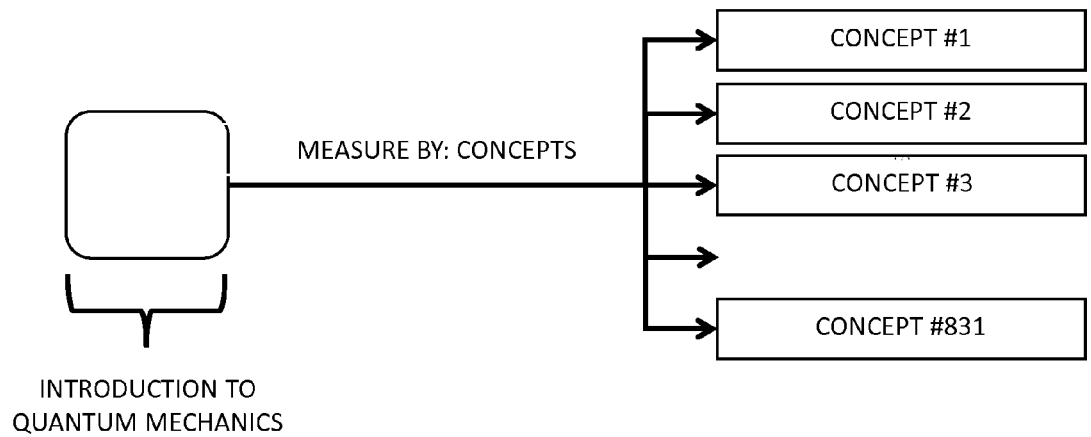

FIG. 9C portrays the dataset called-Introduction to Quantum Mechanics, being broken down by the measurement of concepts. The unit this dataset will be rephrasing in, will be to build with building blocks of "concepts." In this example there are 831 concepts that the data clusters into and in this case there is no remainder. In this example we also did NOT lock the unit so in this case the smallest unit will be concepts.

Figure 9D:
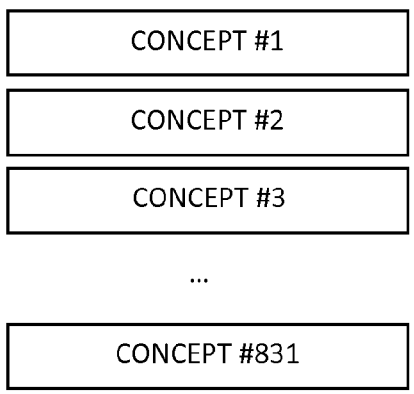
Figure 9D:
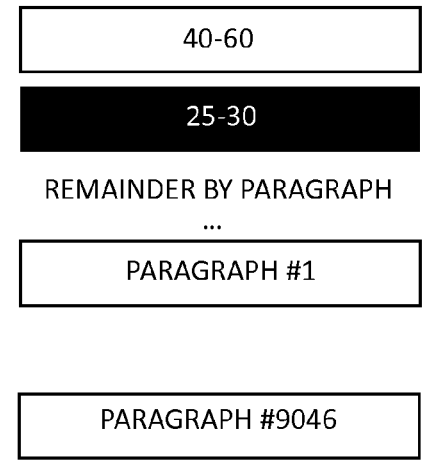

FIG. 9D portrays initiating the comprehension normalization between these two sets. The age group 25-30 is highlighted. While the Introduction to Quantum Mechanics data pool will be rephrasing all of the age groups/remaining paragraphs of the State of Physicists data pool, the example will only show one group being rephrased back and forth. In this example the group we are showing the rephrasing for will be the 25-30 year olds cluster. Within the cluster is all of the data pertaining to the 25-30 year olds measurement. In this biographical quantum book the cluster contains data about certain physicists like Heisenberg, Pauli, and Dirac and in the surrounding material just a little about each's contributions in paragraphs and sentences surrounding the aging classification. This is the material that the other data set will use to rephrase by its units of concepts.

Figure 9E:
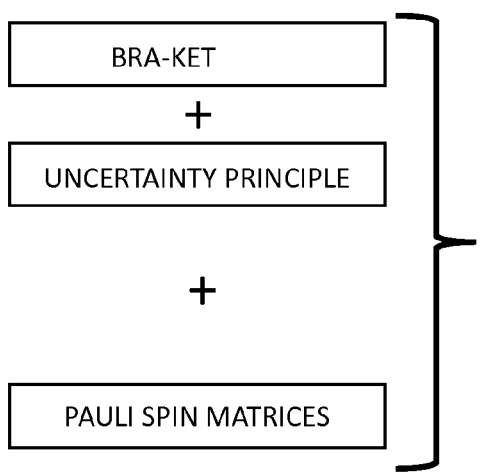
Figure 9E:
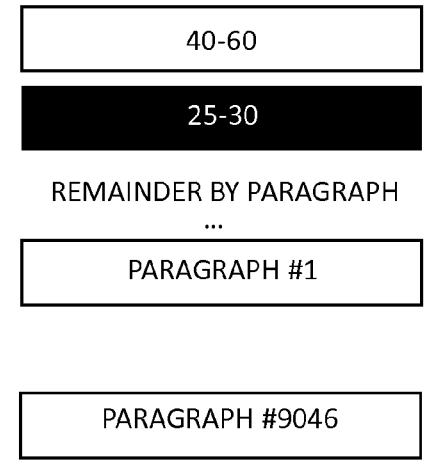

FIG. 9E portrays the three concepts which taken together best restate any of the material within the cluster "25-30" years old (e.g., "Bra-Ket", "Uncertainty principle", and "Pauli spin matrices" resonates with the 25-30 year olds cluster). In this situation the clusters are about the concept Pauli is responsible for, for one, the pauli spin matrices, represented by the title Pauli spin matrices, the concept Heisenberg is responsible for and the material on it clustered here as the Uncertainty Principle, and one of the concepts Dirac is responsible for of the material about the Bra and Ket titled Bra-Ket in the example. The 25-30 years old group could have brought up these three concepts to rephrase it because of commonalities in individuals and concepts mentioned among other relationships it could have contained. This allows connection(s) to be made between the three clusters to be made, which may be explained by the 25-30 years old cluster.

Figure 9F:
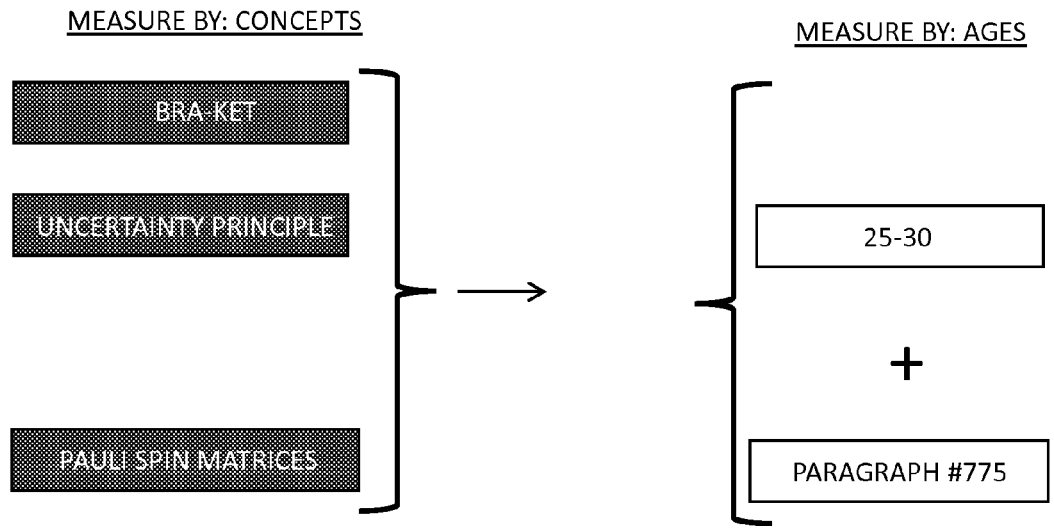

FIG. 9F portrays the three concepts which taken together (as a temporary part or intermediate part) rephrased the 25-30 years old group here as the data being rephrased by the age groups and paragraphs unit of the State of Physicists data pool. The material within those three taken together, contains information that is rephrased best not only with the 25-30 years old cluster, but also by including paragraph #775. Information within paragraph #775 may have been about the accomplishments of someone in the group 25-30 years but not mentioned in a way that could have related it to the 25-30 years old age group cluster until now. These two clusters taken together now best restate the material in the three concepts which taken together had rephrased the original 25-30 years old age group cluster. This advantageously allows a connection to be made between the 25-30 years old cluster and paragraph #775 cluster.

Figure 9G:
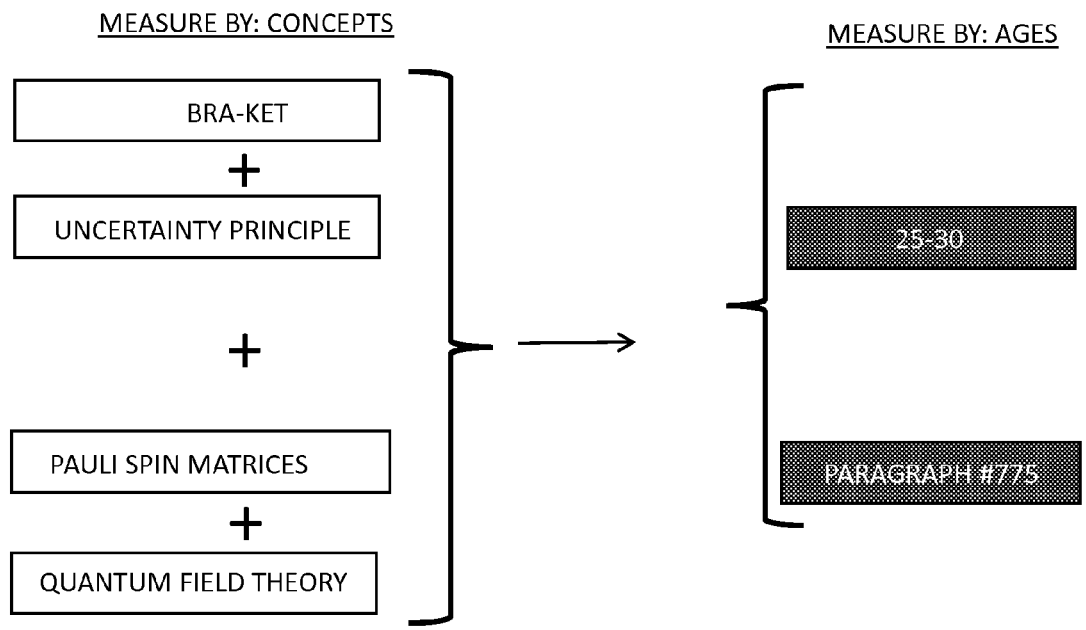

FIG. 9G portrays the two clusters-paragraph #775 and the 25-30 years old group which taken together best rephrase the Concept's rephrasing of the original cluster, being restated by the Concepts group again. Here because of the added material that is in paragraph #775 beyond the concept that had gotten it chosen, may need to induce a fourth concept to completely rephrase it best (e.g., the four concepts: "Bra-Ket", "Uncertainty principle", "pauli spin matrices" and "Quantum Field Theory"). These four concepts now taken together best restate the 25-30 years old cluster and paragraph #775.

Figure 9H:
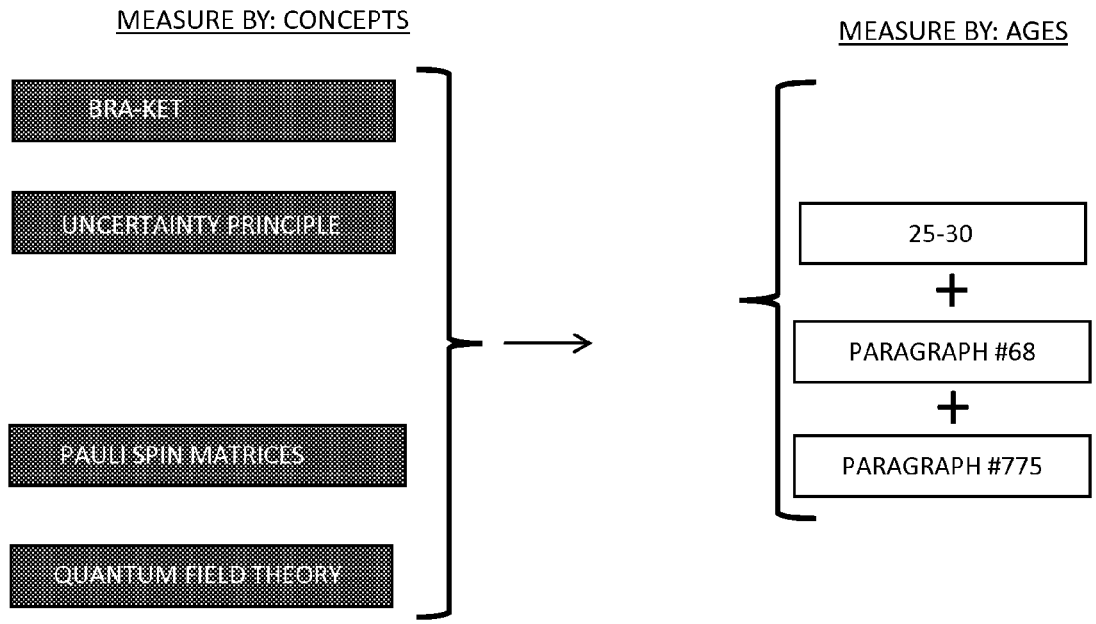

FIG. 9H portrays the four concepts which taken together (as a temporary data set) had been the best restatement, being rephrased by the age groups/paragraphs data pool again. Here because of the new information in the concept Quantum Field Theory which was called up in rephrasing the relevant paragraph #775 related to the original 25-30 years old cluster, the new information in that concept may draw up a final cluster in the age group/paragraphs set, of paragraph #68. These three clusters (e.g., "25-30", "Paragraph #68", and "Paragraph #775") taken together best rephrase the content of the four concepts also taken as one.

Figure 9I:
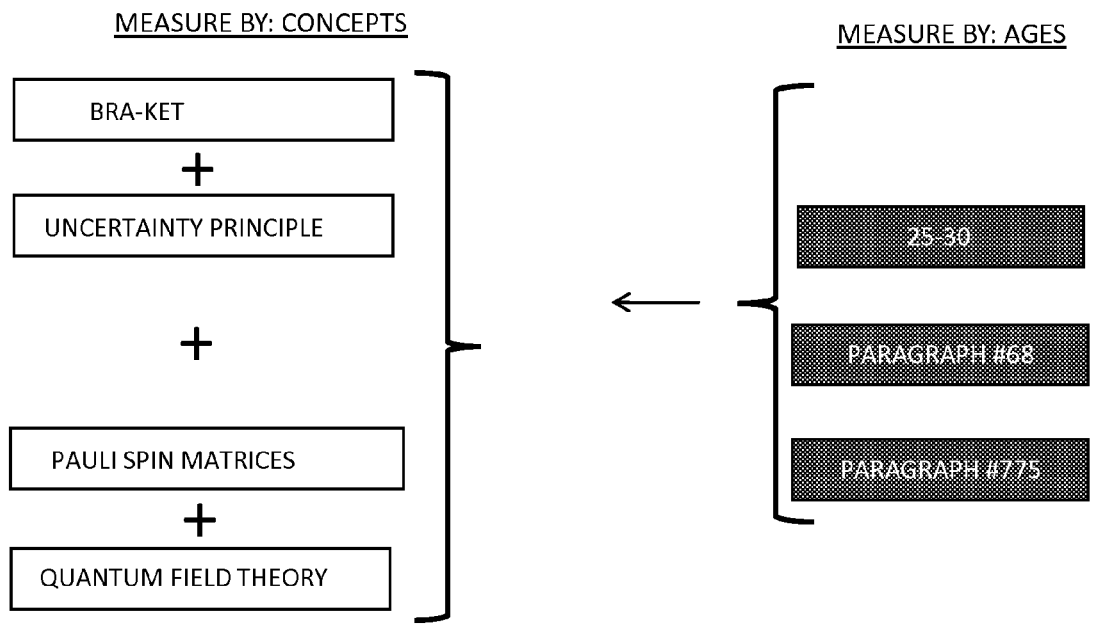

FIG. 9I portrays that a saturation point has been met. The three clusters being rephrased by the concepts set, call up only the same unchanged four concepts (i.e., the four concepts noted in FIG. 9H are the same as the four concepts noted in FIG. 9I), which if they are rephrased by the age group/paragraph pool again will call up the exact same three clusters again. In this example a saturation of the comprehension normalization has temporarily been met. When the data sets change for any reason in any way it is possible the saturation is no longer attained, but for now, the four concepts are the best rephrasing of the original group 25-30 years old.

Figure 9J:
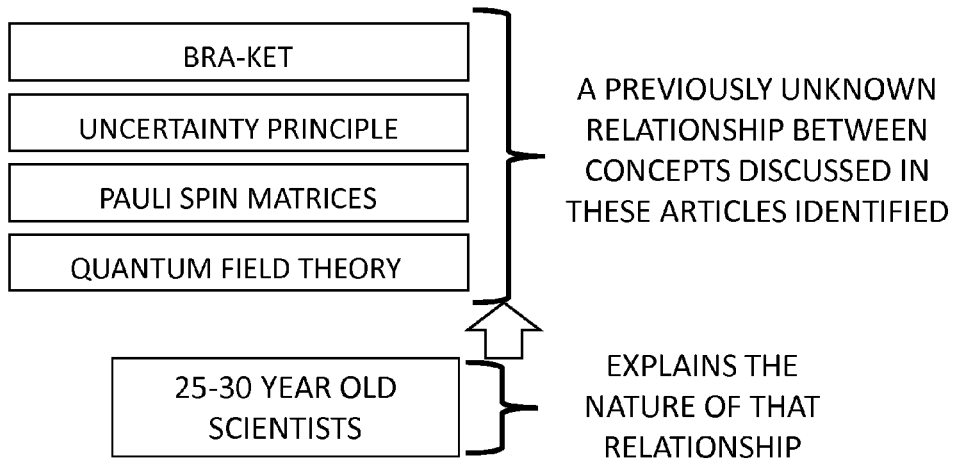

FIG. 9J portrays the end product of the four concepts which have now been related, and the key to their relationship being the material inside of the 25-30 years old cluster from the other data set. A previously unknown relationship between these concepts has been identified. The material within the 25-30 year old cluster explains the nature of the relationship. So by digging into these four concepts in tandem with the understanding that they are somehow related, the researcher may gain insight into the group 25-30 years old scientists, as well as gaining unique understanding of the four now in light of being with each other. Conversely, the four concepts "Bra-Ket", "Uncertainty Principle", "Pauli spin matrices", and "Quantum Field Theory" can also be used to explain or provide insight to the "25-30 year old scientist cluster" and most likely the expanded 25-30 year old cluster expanded to also include cluster "Paragraph #68" and "Paragraph #775"). Furthermore, it is now possible to transfer the language of the data set, i.e., the label "25-30 year old scientists", and use the label "25-30 year old scientists" to relabel a new part having these four concepts/parts "Bra-Ket", "Uncertainty Principle", "Pauli spin matrices", and "Quantum Field Theory". With a new label, the data set from the book introduction to quantum mechanics, can now be compared to a book having nothing to do with anything in it, but does have to do with ages perhaps.

Figure 9K:
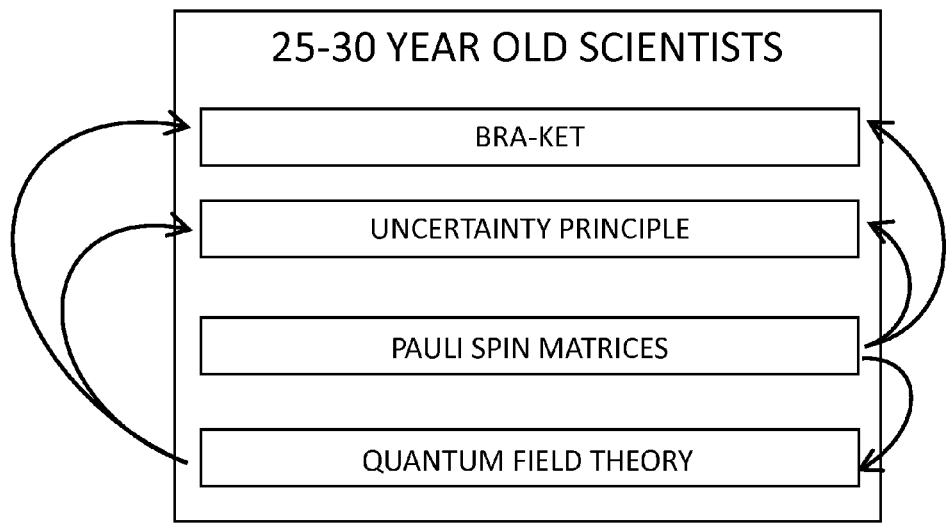

FIG. 9K portrays how the four concepts could potentially shed light on each other taken together. Connections between these four concepts can be made or provide insight to each other of this new found relationship between the four concepts. These connections may be explained by the "25-30 year old scientist cluster" expanded to include cluster "Paragraph #68" and "Paragraph #775").

Not only a researcher can deduce connections between these four concepts as being related to each other, the four concepts "Bra-Ket", "Uncertainty Principle", "Pauli spin matrices", and "Quantum Field Theory" can optionally also be grouped to form a new part. This new part, as discussed in relation to FIG. 9J, can have a new label attributed to it based on the part or parts which resonated with these four concepts (e.g., "25-30 year old scientists"). This new part can be used for the scientific method (once the language of two data sets are normalized to the language of either one of the data sets so they have the same language), and/or used for further iterations of the comprehension normalization method with new data sets that it might not formerly have had any language relevance to.

Figure 9L:
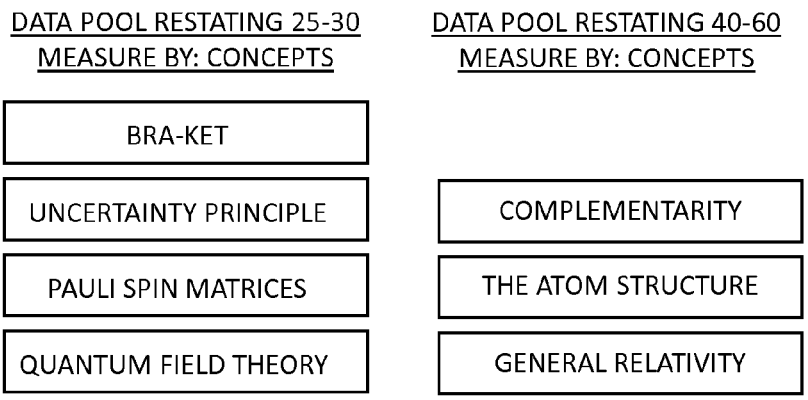

FIG. 9L portrays a comparison that can be used with the results. In this example, simultaneously with rephrasing the 25-30 years old group, this would have performed rephrasing of the other measurements too like 40-60 years old, and the process performed till saturation or sooner, would also generate a new collection of concepts which taken together rephrase the material inside of the 40-60 years old group. After the comprehension normalization has been used to make these new relationships, the program can allow so the researcher could do such as use the material complicit in this relationship rephrasing the 40-60 years old original group, and rephrasing the 25-30 years old original group as two different comparative for a next layer of analysis. This allows the 25-30 years old cluster and the 40-60 year old cluster to be compared and contrasted against each other in a way that cannot be done before comprehension normalization.

What Comprehension Normalization Does and Achieves

This operation allows us to gain insight based on the differences in how words and data and material are used in a different language set through the method of the Comprehension Normalization Method. When Comprehension Normalization is performed with humans, it crystallizes the understanding of the topic within the human, when performed across data, the work product is a more connected and thus insightful data set itself. These are connections that possibly did not exist before at all, and that possibly were unidentifiable by any other comparative method. This is a comparative method that creates connections, accumulates knowledge as per connections, in a completely different way than all other comparative methods. In this comparative method no connections are being generated from across two data sets, but in its own set by doing rephrasing. The data sets become more connected, clearer, and more full—with new pictures in it and new understanding, in each data set itself. This sort of connection can let the researcher see the same materials in different contexts of each other, by reading a portion together as connection. This insight also lets the researcher understand the data from multiple perspectives, the perspectives of the other language. Because this is being applied in an external fashion that has control over both parties (unlike when people do it with each other) it can be used to compare. Now that we have Big Data, big enough to perform this, we have a new comparative method at our disposal to extract new truths, discover more cures, and have a better understanding of our universe.

Comprehension Normalization Method Explanation—Science

The vertical search function and horizontal search function can put the data in a form that is not only ready for comparative analysis through the scientific method but also ready for a whole new comparative method, separate from the scientific method as well as other known comparative methods, called the Comprehension Normalization Method. Advancement in artificial intelligence by replicating a human form of comprehension in the virtual environment. This process is called the Comprehension Normalization Method.

Comprehension Normalization is a process that humans do naturally without even realizing it. It exploits the differences in the language of understanding between people to build insight. The same word can mean different things to different people because each person's understanding of that word is informed by his or her unique life experience. For example, the word "daughter," is just an abstract concept to a person who does not have kids. But for a person who has a daughter, it might evoke thoughts of love or concern. This slight difference in the understanding of words causes each of us to develop a unique language of understanding through which we see the world.

The following is an example of human Comprehension Normalization: If a teacher explains a complicated new idea to her student, the student hears what she said and constructs that idea in his head through his own language of understanding. When he repeats that idea back to the teacher to make sure that he understood it properly, it will be a slightly different idea with his own additions and subtractions based on his understanding of the idea. When the student repeats the idea back to the teacher, the teacher will also gain more insight into her original idea based on the student's unique perspective of it. For instance, the student might say, "Oh, so it's sort of like this . . . " and the teacher might say, "That's really interesting, I hadn't thought about it that way." So the student's take on the teacher's idea will help the teacher understand her own idea better. If they keep going back and forth like this, by the end of this process, the teacher will gain more insight into the ideas in her head and the student will gain more insight into the ideas in his head.

Data sets have now gotten so big that their understanding of words is uniquely informed by the massive amount of information contained within those data sets just like a person's understanding of words is uniquely informed by his or her life experiences. Even traditional data sets have always had their own unique languages. However, because these data sets were so small, there was not enough information inside them to describe the meaning of the words they contained. As a result, their meaning had to be obtained from an external source such as a dictionary. On the other hand, Big Data sets have enough information within themselves to describe the meaning of the words they contain without having to rely on external sources of information. Because the meaning of a word in a Big Data set is uniquely informed by the other information contained in that Big Data set, that Big Data set has a slightly different meaning for that word than other Big Data sets. The Comprehension Normalization Method exploits these differences in the meaning of words or ideas between Big Data sets to build insight.

The Comprehension Normalization Method, described as the method performed by a computer in this patent, is the replication of human Comprehension Normalization in the virtual environment. Duality was used to replicate human Comprehension Normalization in the virtual environment because human Comprehension Normalization is characterized in a broad sense (by slender and remote analogy) by a mathematical concept called anti-commuting and by actions taking place on a dual nature, which is a core component of Quantum Mechanics.

The outcome of Comprehension Normalization between two people is determined by which person initiates the process. For example, if a businessman and an engineer engaged in Comprehension Normalization about the iPhone and the businessman initiated the Comprehension Normalization, it could focus on how the iPhone transformed the business paradigms of wireless carriers, software developers and advertisers. If the engineer initiated the Comprehension Normalization about the iPhone, it could focus on Apple's advances in touchscreen technology that made the development of the iPhone possible. Because the order in which human Comprehension Normalization is initiated matters to the outcome of that process, it is a rough example of anti-commuting, by slender and remote analogy. (Anti-commuting in the broad sense is when the order of two operators: "A" and "B", matters. In lay terms, it makes a difference whether "A" is first and "B" is second or "B" is first and "A" is second. In other words, anti-commuting is when AB is not equal to BA. This is usually represented as: AB−BA≠0 or [AB]≠0.)

Anti-commuting, used by analogy, is evidence that actions have taken place on a dual nature. A nature is the condition in which something exists. A dual nature is when two competing natures exist at the same time. Usually, when someone asks you a question for which there are two possible mutually exclusive answers, the answer can only be one of the two possible answers. In a quasi-Quantum Mechanical analogy, before the answer to the question is decided, the answer is in, by analogy, a superposition state of being both possible answers at the same time. After the answer is decided, the answer, by analogy collapses into being in the discrete state of one possible answer or into being in the discrete state of the other possible answer. For example, if someone asks, "Are you hungry?", before the answer is decided by you, it is in a superposition state of being both "yes" and "no" and after the answer is decided, it collapses into being in the discrete state of "yes" or into being in the discrete state of "no." The superposition state is a nature labeled in this patent as "whole" and all the discrete states taken together constitute another nature labeled in this patent as "parts." These two natures represent the dual nature. Since Quantum Mechanics is the common way to deal with dual natures, it is used by analogy to replicate Comprehension Normalization in the virtual environment.

Since anti-commuting is evidence of operators acting on a dual nature and human Comprehension Normalization displays some level of anti-commuting, the actions that constitute human Comprehension Normalization most easily take place on dual-nature. One nature of the dual nature in human Comprehension Normalization is the idea in a person's head that is in an ambiguous, superposition state and represents the whole. The other nature is comprised of the words that a person uses to express the idea. These words are the idea collapsed into discrete states and taken together they represent the parts. When a teacher and a student engage in Comprehension Normalization and the teacher collapses her idea into words, she is performing an action from one end of the dual nature to the other. When the student builds meaning from the teacher's words through his unique language of understanding and expands her words into an idea, he is also performing an action from one end of the dual nature to the other. In other words, the teacher and the student are performing actions on a dual nature in succession.

In Quantum Mechanics, as used by analogy, performing an action from one end of the dual nature to the other by collapsing the superposition state into discrete states is known as "taking a measurement." The teacher and the student, i.e. the bodies taking measurement, are known as "operators." When two operators perform actions on a dual nature in succession, the process is order-dependent. More specifically, the act of the first operator taking a measurement and collapsing its whole into parts changes the second operator's whole. Therefore, when the second operator takes a measurement and collapses its newly changed whole, the parts that will result also change. Since each measurement builds on the result of the former measurement, it has a cumulative effect. This makes the process order-dependent and anti-commuting. Thus, when the teacher takes a measurement of her idea and collapses it into words, it changes the idea in the student's head and in turn, changes the words that he will use to collapse that newly changed idea.

When the student collapses his newly changed idea into words, he initiates another cycle of them crossing the dual nature in succession. The teacher then builds meaning from the student's words through her unique language of understanding and expands his words into an idea. This process of the student and the teacher again performing actions on a dual nature in succession changes the idea in the teacher's head and in turn, changes the words that she will use to collapse that newly changed idea. Consequently, when the teacher and the student take turns to perform actions on a dual nature in succession multiple times, the ideas and words continuously evolve and therefore, continuously build knowledge.

Similarly, the actions that constitute the Comprehension Normalization Method (the virtual replication of human comprehension normalization described in this patent) also take place on a dual nature. After the vertical search function is used to gather a pool of relevant data into a Big Data set, the horizontal search function can be used to measure that Big Data set by a characteristic. For example, the horizontal search function can be used to measure a Big Data set pertaining to German shepherds by heights, weights, eye colors, diets, ages, etc. Before these characteristics are measured by the horizontal search function, they are in an ambiguous, superposition state and represent the whole. After these characteristics are measured by the horizontal search function, the resulting measurements (for example, if the height characteristic was measured, the resulting measurements would be data clusters of 2 feet, 2.5 feet, 3 feet, etc.) are the discrete states that represent the parts. Therefore, the pre-measurement characteristics, the whole, and post-measurement characteristics, the parts, are the two sides of the dual nature in the Comprehension Normalization Method.

If the horizontal search function is used to measure the German shepherds Big Data set by the heights characteristic and the resulting measurements are data clusters of 2 feet, 2.5 feet and 3 feet, the 2 feet data cluster and the 3 feet data cluster represent the "short German shepherds" Big Data set and the "tall German shepherds" Big Data set, respectively. If the Comprehension Normalization Method was performed between the short German shepherds Big Data set and the tall German shepherds Big Data set, these two Big Data sets would be analogous to the teacher and student from the human Comprehension Normalization example. If the horizontal search function was used to measure the two Big Data sets by the diet characteristic, diet represents the topic on which these two Big Data sets will perform Comprehension Normalization. Pre-measurement, the information in each Big Data set pertaining to diet is in an ambiguous, superposition state and represents the whole. It is analogous to the idea in human Comprehension Normalization. Post-measurement, after the Big Data sets are measured by the diet characteristic, the resulting data clusters are the discrete states that represent the parts. They are analogous to the words in human Comprehension Normalization.

When the short German shepherds Big Data set and the tall German shepherds Big Data set perform the Comprehension Normalization Method and the short German shepherds Big Data set collapses its whole into parts, the short German shepherds Big Data set is performing an action from one end of the dual nature to the other. When the tall German shepherds Big Data set receives each part of the short German shepherds Big Data set by its entire language of understanding, i.e. its whole, it is also performing an action from one end of the dual nature to the other (in a reverse type measurement).

When humans receive a piece of information, that information can mean conflicting things to them because it conjures up different life experiences. For example, when a man hears the word "winter," it can simultaneously mean something positive to him such as the image of his childhood home covered in snow on Christmas or something negative such as the icy road conditions that caused his car accident. In order to perform Comprehension Normalization on Big Data sets, like humans, Big Data sets need to be able to support conflicting meanings for the same piece of information. Just like humans receive a piece of information through their whole life experience, we invented a process through which a Big Data set will receive a part from another Big Data set through its whole, i.e. all of the information contained within it. By enabling a Big Data set to receive parts from another Big Data set through its whole, we made it possible for a Big Data set to support conflicting meanings for the same piece of information, i.e. part. For instance, if the tall German shepherds Big Data set receives a part from the short German shepherds Big Data set relating to an all beef diet, and the whole of the tall German shepherds Big Data set contains a study that concluded that an all beef diet was good for German shepherds and another study that concluded that an all beef diet was bad for a German shepherds, the tall German shepherds Big Data set can simultaneously support the conflicting meanings of an all beef diet.

When the short German shepherds Big Data set takes a measurement of its whole and collapses it into parts, it changes the whole of the tall German shepherds Big Data set and in turn, changes the parts that will result when the tall German shepherds Big Data set collapses its newly changed whole. More specifically, the tall German shepherds big data set forms more connections within the data that it contains, thus changing the whole. This process makes it a more insightful data set to the end user. When the tall German shepherds Big Data set collapses its newly changed whole into parts, it initiates another cycle of the two Big Data sets crossing the dual nature in succession. The short German shepherds Big Data set receives each part of the tall German shepherds Big Data set through its whole. This process of the tall German shepherds Big Data set and the short German shepherds Big Data set again performing actions on a dual nature in succession changes the whole of the short German shepherds Big Data set and in turn, changes the parts that will result when the short German shepherds Big Data set collapses its newly changed whole. Consequently, when the short German shepherds Big Data set and the tall German shepherds Big Data set take turns to perform actions on a dual nature in succession multiple times, the whole and the parts continuously evolve and therefore, continuously build knowledge.

Other Big Data analytics tools simply let users uncover an answer that already exists. For example, a Big Data analytics tool might let a user find out how many cases of the flu were reported in Texas in February, 1996. Even if the user does not know the answer to this query at the onset, there is a definite answer to that query that already exists and this query produces the same answer, every time. On the other hand, when a user performs the Comprehension Normalization Method on two Big Data sets using methods disclosed herein, there is no definite, pre-existing answer. Instead, the answer comes into being by the user performing the Comprehension Normalization Method. Moreover, rather than producing the same answer every time, the answer evolves each time the Comprehension Normalization Method is performed. As a result, no matter how many times the same two Big Data sets are compared using existing Big Data analytics tools, the resulting knowledge would be the same. However, each time the same two Big Data sets are compared using methods disclosed herein, specifically, the Comprehension Normalization Method, additional knowledge is produced, until saturation. This means that the Comprehension Normalization Method is a knowledge growth engine that will literally help users grow more knowledge from their Big Data sets than what already exists within them. Because of this, enterprise customers will be able to extract far more value from their Big Data sets using the methods described herein than with any other Big Data analytics tool.

Relating to the Scientific Method

The scientific method and other methods have been the primary comparative methods used to build knowledge. If someone wanted to discover some fundamental truth about the universe, the scientific method was one of the ways designed to express a level of reliability, in order to discover that truth. The Comprehension Normalization Method is a brand new comparative method, separate from the all other known comparative methods that was specifically designed for use in the Big Data era. Instead of using controls and variables to test a hypothesis to build knowledge like the scientific method, the Comprehension Normalization Method exploits the differences in the languages of understanding between Big Data sets to build knowledge.

For example let's say a researcher wants to gain new insight into patient experiences of the symptoms of Schizophrenia. He starts his research with two Big Data sets: The first data set contains subjective Schizophrenia patient experiences gathered from a hospital's Electronic Medical Records data. The second data set contains scholarly psychiatric journal articles on Schizophrenia from the ScienceDirect/Elsevier database. He is going to use the Comprehension Normalization Method to analyze the patient experiences data set from the perspective of the journals data set. First, the researcher will use the horizontal search function to measure the patient experiences data set by symptoms. One of the resulting measurements is disembodied voice. Then, he will use another horizontal search function to measure the journals data set by articles. The resulting measurements are thousands of articles on Schizophrenia. If he wanted to, he also could have measured the journals data set by paragraphs, sentences or a particular topic.

He will initiate the comprehension normalization method between the patient experiences data set & the journals data set. The Comprehension Normalization Method will analyze all the symptoms in the patient experiences data set from the perspective of all the articles in the journals data set. Many rounds of the Comprehension Normalization Method will be performed automatically to complete this analysis. In this example, we are going to walk you through one symptom in one round in which a particular symptom, disembodied voice, is analyzed from the perspective of the journals data set. The Comprehension Normalization Method goes through thousands of articles in the journals data set and identifies the four articles that, taken together, restate the symptom, disembodied voice. These four articles, taken together, are like a metaphor that can help the researcher better understand the symptom, disembodied voice. Put another way, these four articles are related and the relationship between those articles is the information contained in the disembodied voice part. So by digging into these four articles with the knowledge that they are all somehow related to disembodied voice, the researcher can gain new insight on what causes Schizophrenia patients to experience disembodied voices. For example, he could hypothesize that the damage to the communication hub in the Schizophrenic brain demonstrated by article 5,000 could be the cause of the ipseity disturbance discussed in article 70 as well as the reason why language impulses seem to originate from an atypical location in the brain as shown in article 900. Furthermore, the treatment option described in article 2,000 may help repair the damage to the communication hub from article 5,000 and therefore, could possibly remedy both the ipseity disturbance from article 70 and the atypical origination of language impulses from article 900. By using the Comprehension Normalization Method to analyze a big data set from the perspective of another big data set, the researcher was able to go through a large volume of data & quickly identify connections between concepts previously thought to be unrelated. This insight gives him a huge head start in understanding the underlying reason why those concepts are related and therefore, significantly compresses the amount of time it takes him to conduct research.

When analyzing Big Data, if the Comprehension Normalization Method is performed before the scientific method, it will improve the accuracy of the scientific method. The scientific method works best when there is a high degree of uniformity between the two big data sets that are being compared. However, since most of the Big Data being generated in the world is unstructured and is frequently pooled from a variety of sources, it is difficult to perform the scientific method between two Big Data sets because it would not be an "apples-to-apples" comparison. Performing the Comprehension Normalization Method between two unstructured Big Data sets before the scientific method normalizes the language of understanding between the two Big Data sets and therefore, makes them more uniform to be compared by the scientific method.

There are two kinds of studies that pharmaceutical companies usually conduct: forward looking studies and retrospective analysis. The methods described herein can aid pharmaceutical companies conduct retrospective analysis. For example, imagine that the outcomes research team of a pharmaceutical company wanted to conduct a retrospective analysis to study the effects of a drug. One Big Data set to be included in the analysis could be composed of Medicaid data from the state of California. The other Big Data set could include medical data collected from nurses. The outcomes research team wanted to perform comparisons between the two Big Data sets so that they could identify patterns such as whether more people in California experienced problems with a particular drug than people in other states. However, the two Big Data sets that they wanted to compare defined key terms such as "adverse effects" differently. For instance, the California Medicaid Big Data set might have defined adverse effects to only include heart attacks, death and stroke whereas the nurses Big Data set might have defined adverse effects to include hospital visits, side effects and discontinuation of a drug in addition to heart attacks, death and stroke. So if the California Medicaid Big Data set had 10 adverse events per some population and the nurses Big Data set had 30 adverse events per equal population, a comparison between the two Big Data sets using the scientific method would not be accurate because each data set defined adverse events differently. On the other hand, if the Comprehension Normalization Method were performed on the two Big Data sets using Cornerstone, they would both be normalized so that they could be accurately compared using the scientific method.

More specifically, if the Comprehension Normalization Method were initiated with the nurses Big Data set, the whole would be the nurses Big Data set and one of the parts would be "adverse effects" which includes data about hospital visits, side effects, discontinuation of a drug, heart attacks, death and stroke. Then the California Medicaid Big Data set would receive the adverse effect part from the nurses Big Data set with all of its whole and then identify data about hospital visits, side effects and discontinuation of a drug from different parts within itself and combine it with data about heart attacks, death and stroke from other parts so all of these parts, in aggregate, match the nurses Big Data set's definition of adverse effects. Now comparing the two Big Data sets using the nurses Big Data set's definition of adverse effects yields an apples-to-apples comparison of 45 cases of adverse effects in the California Medicaid Big Data set and 30 cases in the nurses Big Data set. After the Comprehension Normalization Method is performed on the two Big Data sets, the scientific method can now be performed accurately. In other words, the Comprehension Normalization Method enables users to perform the scientific method on Big Data sets pooled from a variety of sources.

Figure 10:
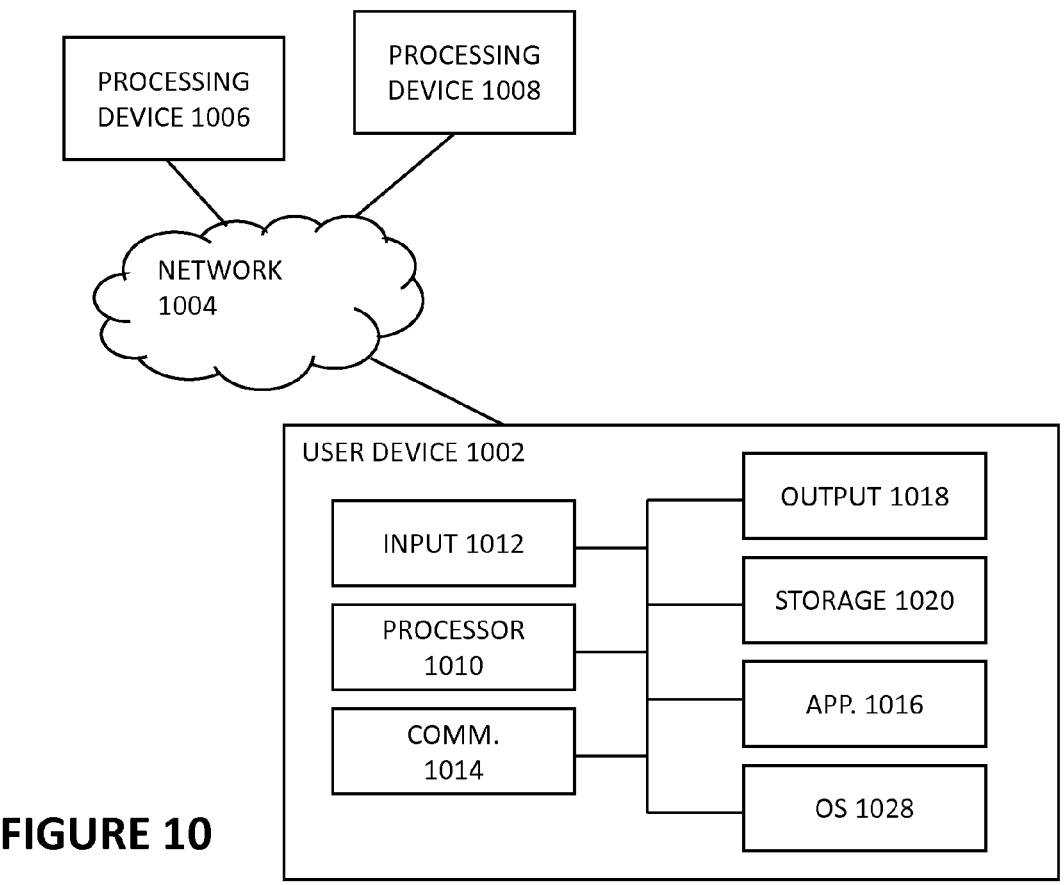
FIG. 10 shows an illustrative computer system for performing comprehension normalization, according to some embodiments of the disclosure.

FIG. 10 shows an illustrative computer system for performing comprehension normalization, according to some embodiments of the disclosure. The comprehension normalization system comprises a user device 1002 that provides an exemplary system usable by a user (e.g., a researcher) to provide inputs to the comprehension normalization method (e.g., input parameters), and to receive and/or view outputs/results of the comprehension normalization method. Generally speaking, a user device is likely, in most cases, not suitable for analyzing big data, thus one or more processing devices (e.g., processing device 1006 and processing device 1008), communicably connected with other parts of this system via network 1004, may be provided for performing the analysis steps of comprehension normalization (e.g., identifying resonating parts and combining said parts, providing and executing a resonance function, etc.). Processing devices 1006 and 1008 (and the like) may be server machines comprising processors and memory elements for processing big data and storing said big data (i.e., the wholes and parts). In some embodiments, the processing devices and/or the user device may provide one or more comprehension normalization modules configured to provide any part of the comprehension normalization methods disclosed herein. These server machines are typically provided in a data center, and may utilize distributed computing methods to perform operations on big data. In this configuration, parameters for the comprehension normalization method can be provided from the user device 1002 to these processing devices 1006 and 1008 to configure the comprehension normalization method over the network 1004. Outputs/results can be provided from processing devices 1006 and 1008 to the user device 1002 over the network 1004 for further processing.

In general, user device 1002 includes several components communicably connected via a bus, those components including input part 1012, output part 1018, processor 1010, storage 1020, application 1016, communication 1014, operating system 1018. Input part 1012 may include at least one of: a touch-sensitive display, camera, microphone, touchpad, keyboard, etc. Output part 1018 may include any sensory output such as a display (e.g., a touch-sensitive display), a speaker, a haptic output device, etc. Processor 1010 and operating system 1018 configured to carry out processes for application 1016, such as carrying out computations, accesses to (digital data) storage 1020, etc. Communication 1014 may include a communication device configured to allow device 1002 to communicate with other devices or systems (e.g., processing devices 1006 and 1008), e.g., via the Internet, Intranet, Wifi, or mobile network. The user device 1006 may use processor 1010 to render a graphical user interface for display via output part 1018 and/or input part 1012, to facilitate user interaction with the comprehension normalization system.

Figure 11:
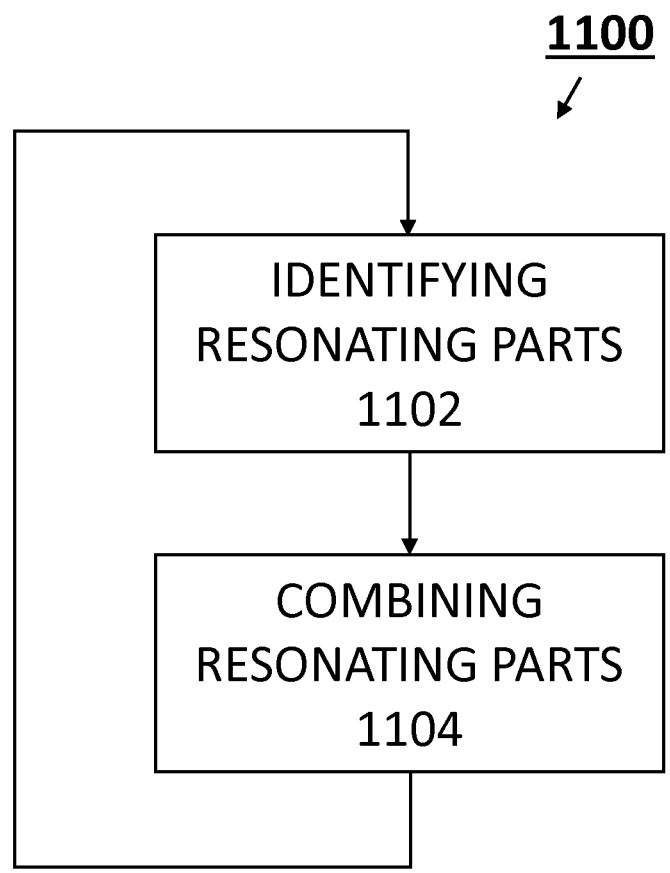
FIG. 11 shows an illustrative flow diagram for performing the method of comprehension normalization, according to some embodiments of the disclosure.

FIG. 11 shows an illustrative flow diagram for performing the method of comprehension normalization, according to some embodiments of the disclosure. The method 1100 comprises identifying one or more first-resonating parts in the second set of parts having resonance with a first part of the first set of parts using a resonance function (box 1102), combining the one or more first-resonating parts in the second set into a first intermediate data set (box 1104), and identifying one or more second-resonating parts in the first set of parts having resonance with the first intermediate data set using the resonance function (box 1102).

The method may further include combining the one or more second-resonating parts in the first set of parts into a second intermediate data set (box 1104), and identifying one or more third-resonating parts in the second set of parts having resonance with the second intermediate data set using the resonance function (box 1102). This method may continue until saturation is reached, i.e., repeating the identifying and combining steps until resonating parts in the first set of parts and resonating parts in the second set stop changing after the identifying and combining steps (box 1104 and box 1102).

System Illustrations and Variations

In one example implementation, any components used for processing and storing information usable in achieving the comprehension normalization procedure procedures, as discussed herein, may include non-transitory computer-readable media for storing the information. Additionally, any of components described herein, such as processing devices or user devices may include instances of a processor that can execute software or an algorithm to perform the comprehension normalization procedures, as disclosed in this Specification. These devices may further keep information (e.g., variables) in any suitable computer-readable non-transitory storage part or memory element [random access memory (RAM), ROM, EPROM, EEPROM, ASIC, etc.], software, hardware, or in any other suitable component, device, element, or object where appropriate and based on particular needs. Any of the memory items discussed herein (e.g., database, tables, trees, cache, etc.) should be construed as being encompassed within the broad term 'memory element.' Similarly, any of the potential processing elements, modules, and machines described in this Specification should be construed as being encompassed within the broad term 'processor.' Each of the components described herein can also include suitable interfaces for receiving, transmitting, and/or otherwise communicating data or information in a network environment.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

The particular embodiments of the present disclosure may readily include a system on chip (SOC) central processing unit (CPU) package. An SOC represents an integrated circuit (IC) that integrates components of a computer or other electronic system into a single chip. It may contain digital, analog, mixed-signal, and radio frequency functions: all of which may be provided on a single chip substrate. Other embodiments may include a multi-chip-module (MCM), with a plurality of chips located within a single electronic package and configured to interact closely with each other through the electronic package. In various other embodiments, the digital signal processing functionalities may be implemented in one or more silicon cores in Application Specific Integrated Circuits (ASICs), Field Programmable Gate Arrays (FPGAs), and other semiconductor chips.

In example implementations, at least some portions of the processing activities outlined herein may also be implemented in software. In some embodiments, one or more of these features may be implemented in hardware provided external to the elements of the disclosed figures, or consolidated in any appropriate manner to achieve the intended functionality. The various components may include software (or reciprocating software) that can coordinate in order to achieve the operations as outlined herein. In still other embodiments, these elements may include any suitable algorithms, hardware, software, components, modules, interfaces, or objects that facilitate the operations thereof.

In one example embodiment, any number of embodiments disclosed herein may be implemented on a board of an associated electronic device. The board can be a general circuit board that can hold various components of the internal electronic system of the electronic device and, further, provide connectors for other peripherals. More specifically, the board can provide the electrical connections by which the other components of the system can communicate electrically. Any suitable processors (inclusive of digital signal processors, microprocessors, supporting chipsets, etc.), computer-readable non-transitory memory elements (e.g., storage or memory elements), etc. can be suitably coupled to the board based on particular configuration needs, processing demands, computer designs, etc. Other components such as external storage, additional sensors, controllers for audio/video display, and peripheral devices may be attached to the board as plug-in cards, via cables, or integrated into the board itself.

Any suitably-configured processor component can execute any type of instructions associated with the data to achieve the operations detailed herein. Any processor disclosed herein could transform an element or an article (for example, data) from one state or thing to another state or thing. In another example, some activities outlined herein may be implemented with fixed logic or programmable logic (for example, software and/or computer instructions executed by a processor) and the elements identified herein could be some type of a programmable processor, programmable digital logic (for example, a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof. In operation, processors may store information in any suitable type of non-transitory storage medium (for example, random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. Further, the information being tracked, sent, received, or stored in a processor could be provided in any database, register, table, cache, queue, control list, or storage structure, based on particular needs and implementations, all of which could be referenced in any suitable timeframe. Any of the memory items discussed herein should be construed as being encompassed within the broad term 'memory' or 'memory element'. Similarly, any of the potential processing elements, modules, and machines described herein should be construed as being encompassed within the broad term 'microprocessor' or 'processor.'

Computer program logic implementing all or part of the functionality described herein is embodied in various forms, including, but in no way limited to, a source code form, a computer executable form, and various intermediate forms (for example, forms generated by an assembler, compiler, linker, or locator). In an example, source code includes a series of computer program instructions implemented in various programming languages, such as an object code, an assembly language, or a high-level language such as OpenCL, Fortran, C, C++, JAVA, or HTML for use with various operating systems or operating environments. The source code may define and use various data structures and communication messages. The source code may be in a computer executable form (e.g., via an interpreter), or the source code may be converted (e.g., via a translator, assembler, or compiler) into a computer executable form.

Note that with the numerous examples provided herein, interaction may be described in terms of two, three, four, or more electrical components. However, this has been done for purposes of clarity and example only. It should be appreciated that the system can be consolidated in any suitable manner. Along similar design alternatives, any of the illustrated components, modules, and elements of the FIGURES may be combined in various possible configurations, all of which are clearly within the broad scope of this Specification. In certain cases, it may be easier to describe one or more of the functionalities of a given set of flows by only referencing a limited number of electrical elements. It should be appreciated that the electrical circuits of the FIGURES and its teachings are readily scalable and can accommodate a large number of components, as well as more complicated/sophisticated arrangements and configurations. Accordingly, the examples provided should not limit the scope or inhibit the broad teachings of the electrical circuits as potentially applied to a myriad of other architectures.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims. The 'means for' in these instances (above) can include (but is not limited to) using any suitable component discussed herein, along with any suitable software, circuitry, hub, computer code, logic, algorithms, hardware, controller, interface, link, bus, communication pathway, etc. In a second example, the system includes memory that further comprises machine-readable instructions that when executed cause the system to perform any of the activities discussed above.

Note that all optional features of the apparatus described above may also be implemented with respect to the method or process described herein and specifics in the examples may be used anywhere in one or more embodiments.

In accordance with the well-established principle that an "applicant is entitled to be his or her own lexicographer," MPEP 2111.01(IV), citing In re Paulson, 30 F.3d 1475, 1480 (Fed. Cir. 1994), certain terms have been expressly defined herein. It is expressly intended that those terms have the definitions supplied, and that they not be given any interpretation inconsistent with those definitions.

EXAMPLES/SUMMARY OF FEATURES

Example 1 is a method for normalizing comprehension of a first data set and a second data set, the first data set comprising a first set of parts, and the second data set comprising a second set of parts, the method comprising: identifying one or more first-resonating parts in the second set of parts having resonance with a first part of the first set of parts using a resonance function; combining the one or more first-resonating parts in the second set into a first intermediate data set; and identifying one or more second-resonating parts in the first set of parts having resonance with the first intermediate data set using the resonance function.

Example 1 illustrates the basic steps for initializing and performing comprehension normalization, allowing the first rephrasing to occur by finding parts in another whole which resonates with the first part of the first data set. It can also be looking for parts in the second data set's whole that resonant with the second part of the first data set, and the third part, etc. Numerous parts from the first data set can seek resonance in the second's whole at the same time. An iteration of this reflexive and iterative method can include these basic steps being performed back and forth alternating having the second data set and the first data set as the receiving whole. The steps being repeated can thus be seen as the duple: identify+combine, or combine+identify; Identify parts that resonate with a part on the other data set+combine resonating parts into a newly created part, or combine (previously identified resonant) parts into a newly created part+identify resonance between that newly created part and parts from the other data set. Note that the first data set and the second data set are two pools of data. The data sets usually comprise large sets of data, as most data sets are in Big Data. The data sets could be generated using vertical searching. Alternatively, the data may simply be a pool of data grouped by other means (e.g., all journal articles in the New York Times, journal articles between 1990-2000 published in Nature, all patient data recorded at New England Hospitals, all text in a book, etc.). For brevity, the first data set and the second data set is described, but other data sets may also be part of the comprehension normalization method (e.g., a third data set, a fourth data set, and so forth) to which this comprehension normalization method can be applied.

Advantageously, the comprehension normalization method can already provide insight connecting the one or more first-resonating parts in the second set, which no other analytical tool can provide. By combining those first-resonating parts into the first intermediate (or temporary) data set, the method can reflexively look towards the first data set to continue comprehension normalization, and to gain more information and insight through further rephrasings.

When the comprehension normalization method is performed between two big data sets, both data sets take turns rephrasing the material of the other data set in their own language of understanding. For example, if the Comprehension Normalization Method is initiated between X big data set & Y big data set, Y will rephrase the material in X in Y's own language of understanding. This act of rephrasing a foreign idea connects the data within Y in a way it had not been connected before. After X & Y take turns rephrasing back & forth like this, at the end of the process, the data within both X and Y will become more connected than ever before & therefore, more insightful to the user. This process enables users to analyze their Big Data from multiple perspectives. For example, when the Comprehension Normalization Method is initiated between X & Y, X is analyzed from the perspective of Y. If the Comprehension Normalization Method is initiated between X & Q, X is analyzed from the perspective of Q. Simply put, X can be analyzed from the perspective of any other Big Data set. Analyzing a big data set from the perspective of another big data set is like using a metaphor to clarify an idea. A metaphor is a rephrasing. It is saying the same thing in another language of understanding so that you can understand the original idea better. Similarly, rephrasing a data set from the perspective of another big data set helps you gain more insight from the original data set. This enables users to quickly extract new kinds of insights from their Big Data such as deep cross-disciplinary insight. For example, an ophthalmologist can quickly analyze thousands of medical journals from the perspective of oncology data, cardiology data, or from any other perspective. Without the Comprehension Normalization Method, the ophthalmologist would first have to do years of residency in oncology or cardiology. Only then would he be able to pick up the nuances of the languages of those fields to gain that specific insight. Performing such multi-perspective analysis is unique to the Comprehension Normalization Method In Example 2, the subject matter in Example 1 can further include: combining the one or more second-resonating parts in the first set of parts into a second intermediate data set; and identifying one or more third-resonating parts in the second set of parts having resonance with the second intermediate data set using the resonance function.

Example 2 provides the further reflexive steps for continuing to rephrase the data set using the meanings from the first data set and the second data set. At this point, insight is gained by seeing there is a connection between the one or more second-resonating parts, which no other data tool was able to provide before. Even more insight is gained by seeing there is also a connection between the one or more third-resonating parts as well. It is to be appreciated that as these steps are performed, the parts being found to resonate with the intermediate data set at each iteration would change (expand or shrink) at each iteration of the reflexive method. This means more insight is gained within a data set as the intermediate parts evolve and as different parts are identified to resonate with those intermediate parts.

In Example 3, the subject matter in Example 2 can further include: repeating the identifying and combining steps until resonating parts in the first set of parts and resonating parts in the second set stop changing after the identifying and combining steps.

Example 3 provides the condition for repeating these identifying and combining steps until saturation is reached. At each iteration of the reflexive method, resonating parts are identified from the first set of parts (the first data set) or from the second set of parts (the second data set). At some point, with sufficient iterations, the resonating parts being identified will cease to change. This is the saturation condition. Once saturation is reached, one or more resulting resonating parts of the second set of parts can be seen as parts which are connected to each other, and one or more resulting resonating parts of the first set of parts can also be seen as parts which are connected to each other. The connection found between the resulting resonating parts of the first data set can be explained by the resulting resonating parts of the second data set (and vice versa). Suppose the method starting with the first part of the first set of parts finds resulting resonating parts in the second set of parts, and the method is also performed starting with a second part of the second set of parts, then the resulting resonating parts found by starting with the second set of parts can be used for comparing the first part of the first set of parts against the second part of the second set of parts in a way that could never have been done before.

Suppose further the method starting with the first part of the first set of parts finds resulting resonating parts in the second set of parts, and the method is also performed starting with a second part of the first set of parts, both of these inducing newly created parts in the second data set, then the resulting resonating parts found in the second set of parts can be used for comparing the first part of the first set of parts against the second part of the first set of parts in a way that could never have been done before. The iterations could also be run for a set number of times that stops even before saturation is achieved.

In Example 4, the subject matter of any one of Examples 1-3 can optionally include the resonance function comprising identifying a sufficient number of keyword matches between two parts.

Example 4 may include any suitable algorithms for tabulating matches in keywords in order to deduce resonance and resemblance between two parts (i.e., two sets of data). For instance, a dictionary of words in a first part can be used to search for matches (which may or may not be exact matches) in a second part. If a sufficient number of matches are found in the second part matching the dictionary of words (the number can be a parameter of the resonance function tunable by a user), then the resonance function may identify the part as a resonating part. Stems of words may be used to find matches as well. Common words may be excluded from the keyword matching. The keyword matching provides one of many ways to identify a data set as being related or resonates with another data set through the usage of the same or similar words.

In Example 5, the subject matter of any one of Examples 1-4 can optionally include the resonance function comprising identifying resonance between two parts based on one or more semantic rules.

Example 5 provides using semantic rules to find resonance. Semantic rules are more advanced and can include things like causation deducing relationships, for example if it said Harry wears blue socks. And in another sentence within the same data set (but maybe a different part) also said people with blue socks are physicists, then even if those two sentences are separated across parts, a part comprising only half of the relationship can still find resonance with a part in the other data set that only mentions the other half of the relationship. Semantic rules can also cause negations of keywords or relationships to exist Semantic rules can include using Boolean logic. Semantic rules could also include the use of Bayesian networks in order to identify resonance. Semantic rules can also include using findings about linguists in forming algorithms finding resonance.

In Example 6, the subject matter of any one of Examples 1-5 can optionally include the resonance function comprising identifying resonance between two parts based on one or more logic rules, wherein the logic rules are provided on the basis of logical relationships found the first data set and/or the second data set.

Example 6 provides including rules from formal and informal logic into the algorithms for determining resonance, by inference-able relationships. For example, in the sentence Bob went home, or, to the mall. And it is discovered that Bob went to the mall, then there would be NO resonance with a part on the other side that said Bob went home. This is part of the function that could really help the algorithm with subtracting parts from a newly created part, in addition to merely adding. All forms of logical algorithms could be used.

In Example 7, the subject matter of any one of Examples 1-6 can optionally include generating at least some of the first set of parts from the first data set using horizontal search; and/or generating at least some of the second set of parts from the second data set using horizontal search.

Example 7 illustrates one of many ways for generating parts from data sets. This way of generating at least some of the parts using horizontal search allows the data to form clusters through any suitable clustering algorithms. Clustering algorithms may more naturally generate parts to a data set based on how the data set ought to be divided. Also, clustering algorithms may alleviate the responsibility of a user to fully understand the Big Data Set (which might not always be possible) by generating the parts almost automatically for the user without having to ask the user which exact parts he/she may want from the data set.

In Example 8, the subject matter of any one of Examples 1-7 can optionally include: generating at least some of the first set of parts from the first data set based on a first parameter provided by a user; and/or generating at least some of the second set of parts from the second data set based on a second parameter provided by the user.

Example 8 provides a feature which allows the user/researcher to tune the generation of parts. Generally, the generation of parts can be parameterizable by the research in order to tune the comprehension normalization algorithm. The tuning may be performed to organize the data set and its parts to fit better with a finding that a research is seeking. The generating of parts may also depend on the nature of the data set itself. The parameter could be set to tune the specificity of a clustering algorithm (to adjust how granular/big the clusters/parts should be), to specify the parts to be created, to specify the size of the parts, to specify the diversity to be exhibited by the parts, etc.

Note that, generally speaking, data can be a member of multiple parts, or the generation of parts can segment the data set such that data can be a member of only one part. Furthermore, one or more ways may be used in combination to generate the parts.

In Example 9, the subject matter of any one of Examples 1-8 can optionally include: generating, based on a first specified unit of data, at least some of the first set of parts from the first data set from a first remainder of data which does not fit into other parts of the first set of parts; and/or generating, based on a second specified unit of data, at least some of the second set of parts from the second data set from a second remainder of data which does not fit into other parts of the first set of parts.

Example 9 provides a way to divide up the data which may or may not fit with other parts (i.e., a remainder). In one example described in the description, a research may first find clusters/parts related to a set of concepts, but then also divide up the data which did not fit into those concepts by page, or paragraph. This provide an alternative way of generating parts, parameterizable by the user/researcher. Advantageously, having the remainder also broken into parts, lets even sections that don't neatly below to a breakdown, participate in the analysis with parts/whole. If the remainder is just left as a large chunk (and not also able to be broken down into smaller parts), then that chunk loses most of the advantages of comparing a part with a whole. This lets that which comprises the remainder chunk to have those advantages in addition to the normal breakdown.

In Example 10, the subject matter of any one of Examples 1-9 can optionally include: generating at least some of the first set of parts from the first data set without breaking a first smallest allowable unit of data; and/or generating at least some of the second set of parts from the second data set without breaking a second smallest allowable unit of data.

Example 10 provides yet another way to generate parts. Generating parts may often segment the data so that the segmented data would belong to different parts. However, in some cases, the user/research may want to lock the unit of division such that the data would not be broken or segmented into pieces smaller than the smallest allowable unit of data. For instance, in patient data, it is possible that the smallest allowable unit of data for generating parts of a whole may need to keep all data belonging to a particular patient together such that the data belonging to the particular patent cannot be segmented into parts, but in totality will occur together in any part it occurs in. Advantageously, making a smallest allowable unit keeps things that you want to analyze together intact. Otherwise different pieces of information, that you want to analyze as all together, without a smallest allowable unit containing them, the details/pieces could be spread across many parts and you won't be including all of the information about "that patient" or "that drug" or "that school" or "that park" or "that decade" in a unified place for the analysis, meaning that causal inferences could be split, and that correct resonance to the research of interest can't be made.

In Example 11, the subject matter of any one of Examples 1-10 may optionally include generating at least some of the first set of parts from the first data set according to a first sensitivity parameter such that the at least some of the first set of parts are differentiated from each other according to a first pre-determined level of differentiation; and/or generating at least some of the second set of parts from the second data set according to a second sensitivity parameter such that the at least some of the second set of parts are differentiated from each other according to a second pre-determined level of differentiation.

Example 10 provides yet another feature for how a user/research may tune the generation of parts to improve the comprehension normalization algorithm. Specifically, this feature allows a user to tune a sensitivity parameter which may affect whether a particular data point or unit of data would belong to a particular set. If the parameter is very sensitive, each of the part may have most of the data points, which would not provide a lot of differentiation between each other. As a result, the comprehension normalization is very unlikely to be able to have meaningful results (either most of the parts would have resonance or very little of the parts would have resonance with an intermediate data set). If the parameter is not very sensitive, then the parts may be too differentiated, which could also make it difficult to find resonance. The comprehension normalization method could provide a metric for determining the level of differentiation between data sets (e.g., a count of common or unique data points, a variance value, etc.). In one instance, generating parts could involve using membership functions which takes a data point as input, and outputs which part or parts the data point belongs. The membership function thus may include the sensitivity parameter for tuning how sensitive the membership function should be.

In Example 12, the subject matter of any one of Examples 1-11 can include the resonance function being parameterizable based on a third parameter provided by a user for adjusting the sensitivity of the resonance function.

Example 12 provides a feature which allows a user to adjust how easy it would be for the resonance function to identify a part as a resonating part. This parameter preferably affects how resonant two parts are or how much should two parts resemble each other or relates to each other in order for a part to be identified as a resonating part. For instance, the parameter may adjust the number of keyword matches needed in order to identify a part as a resonating part.

In Example 13, the subject matter of any one of Examples 1-12 can include the resonance function being parameterizable based on a fourth parameter not provided by a user for adjusting the sensitivity of the resonance function, wherein the fourth parameter is determinable based on a measurable difference(s) between the first data set and the second data set.

Example 13 provides a feature for adjusting the resonance function to the nature of how different two data sets are. In some cases, the resonance function can be chosen or designed to work specifically with the type of data sets to which the method is applied. This also means that the resonance function can be tuned based on how different the two data sets are (e.g., determined either by the user/researcher, or by a computer). If the two data sets are very In Example 14, the subject matter of any one of Examples 1-13 can optionally include the resonance function being parameterizable based on the number of times the identifying and combining steps are executed for adjusting the sensitivity of the resonance function.

Example 14 provides a feature which allows the system to decide how to adjust the resonance function, especially as more iterations of the comprehension normalization are being executed. For instance, the resonance function can be tuned to be less sensitive (making it harder to identify resonance between two parts, compared to the sensitivity of the resonance function at later iterations) such that fewer resonating parts can be identified. The more sensitive resonance function (easier to identify resonance between two parts) can be used in later iterations. This will allow for small changes in performing the first rounds of organizing into newly created parts, and as the parts start to take shape, making their resonance function more sensitive so it can resonate with things it couldn't resonate with before when the divisions of the newly created parts were less developed. It is more advantageous that a well defined part look for resonance with greater sensitivity, but the greater sensitivity could be erroneous (e.g. over inclusive) if it is used with an undeveloped part. The reflexive method of comprehension normalization method can thus be dynamically adjusted by changing the sensitivity of the resonance function, e.g., based on the number of iterations the method has executed, or some other measure of completeness/stage of execution of the algorithm (e.g., towards saturation). In some embodiments, the sensitivity of the resonance function can be dynamically adjusted based on other factor(s) or condition(s) besides the number of iterations.

In Example 15, the subject matter of any one of Examples 1-14 may optionally include: identifying one or more fourth-resonating parts in the second set of parts having resonance with a second part of the first set of parts using a resonance function (e.g. performing the resonance search and regrouping process with multiple parts at the same time); combining the one or more fourth-resonating parts in the second set into a third intermediate data set; and identifying one or more fifth-resonating parts in the first set of parts having resonance with the third intermediate data set using the resonance function (e.g. back and forth, forth from set one to two and back from set two's newly created parts (e.g., intermediate part) to one).

Example 15 illustrates how the same method can be applied again by starting with another part of the first set of parts (or any other part of the first set of parts). This may be particularly useful if the comprehension normalization method is used to compare the one part of the first data set with another part of the first data set in the measure of the second data set.

In Example 16, the subject matter of any one of Examples 1-15 may optionally include: identifying one or more sixth-resonating parts in the first set of parts having resonance with a third part of the second set of parts using a resonance function; combining the one or more sixth-resonating parts in the first set into a fourth intermediate data set; and identifying one or more seventh-resonating parts in the second set of parts having resonance with the fourth intermediate data set using the resonance function.

Example 16 illustrates how the same method can be applied again by starting with another part of the second set of parts (or any other part of the second set of parts, e.g., back and forth, forth from the second data set to the first data set and back from an intermediate data set from the first data set back to the second data set). The method is applicable going in either directions: either having the first data set as the receiving data set or having the second data set as receiving data set.

In Example 17, the subject matter of any one of Examples 1-16 can optionally include: generating at least some of the first set of parts from the first data set by combining one or more resonating parts identified by an instance of the method for normalizing comprehension, wherein label(s) attributed to the at least some (or one or more) of the first set of parts is derived from an intermediate data set (or one or more parts) with which the one or more resonating parts are identified; and/or generating at least some of the second set of parts from the second data set by combining one or more resonating parts identified by an instance of the method for normalizing comprehension, wherein label(s) attributed to the at least some of the second set of parts is derived from an intermediate data set (or one or more parts) with which the one or more resonating parts are identified.

Example 17 provides a way for a data set to adopt the language of another data set by reorganizing itself, i.e., generating new part(s)), and attributing new label(s) to the new parts. A new part can be generated using one or more resonating parts, and a new label can be attributed to the new part using the intermediate data set with which the resonating parts were identified. The new label attributed to the part is also included to the substance within the part. Advantageously, new parts can be added back into the data set for further analysis. New parts having the language of the other data by way of adopting a new label can facilitate comparing the parts from that data set another third, previously unrelated data set (that is more related to the data set that provided the language to relabeling the parts). It can also facilitate comparing by other methods like the scientific method, two data sets which evolved (through normalization comprehension) to have the same language (i.e., labels).

Example 18 a system for normalizing comprehension of a first data set and a second data set, the first data set comprising a first set of parts, and the second data set comprising a second set of parts, the system comprising, one or more processors, one or more memory elements, a comprehension normalization module, that when executed by the at least one processors is configured to: identify one or more first-resonating parts in the second set of parts having resonance with a first part of the first set of parts using a resonance function; combine the one or more first-resonating parts in the second set into a first intermediate data set; and identify one or more second-resonating parts in the first set of parts having resonance with the first intermediate data set using the resonance function.

In other examples, the subject matter of Example 18 can optionally include any subject matter of Examples 2-17.

Example 19 is at least one machine readable non-transitory storage medium having instructions stored thereon for providing intelligent suggestions in visualizing network security data, wherein the instructions when executed by at least one processors cause the at least one processors to perform the following operations for normalizing comprehension of a first data set and a second data set, the first data set comprising a first set of parts, and the second data set comprising a second set of parts, the operations comprising: identifying one or more first-resonating parts in the second set of parts having resonance with a first part of the first set of parts using a resonance function; combining the one or more first-resonating parts in the second set into a first intermediate data set; and identifying one or more second-resonating parts in the first set of parts having resonance with the first intermediate data set using the resonance function.

In other examples, the subject matter of Example 19 can optionally include any subject matter of Examples 2-17.

Example 20 is a system for normalizing comprehension of a first data set and a second data set, the first data set comprising a first set of parts, and the second data set comprising a second set of parts, the system comprising, means for identifying one or more first-resonating parts in the second set of parts having resonance with a first part of the first set of parts using a resonance function; means for combining the one or more first-resonating parts in the second set into a first intermediate data set; and means for identifying one or more second-resonating parts in the first set of parts having resonance with the first intermediate data set using the resonance function.

In other examples, the subject matter of Example 20 can optionally include any subject matter of Examples 2-17.

What is claimed is:

1. A method for normalizing comprehension of at least one of a first data set and a second data set, the first data set comprising a first set of parts, and the second data set comprising a second set of parts, the method comprising:
    identifying one or more first-resonating parts in the second set of parts having resonance with a first part of the first set of parts using a resonance function;
    combining the one or more first-resonating parts in the second set into a first intermediate data set;
    identifying one or more second-resonating parts in the first set of parts having resonance with the first intermediate data set using the resonance function;
    identifying one or more third-resonating parts in the second set of parts having resonance with a second part of the first set of parts using the resonance function;

combining the one or more third-resonating parts in the second set into a second intermediate data set; and identifying one or more fourth-resonating parts in the first set of parts having resonance with the second intermediate data set using the resonance function.

2. The method of claim 1, further comprises:

combining the one or more second-resonating parts in the first set of parts into a third intermediate data set; and identifying one or more fifth-resonating parts in the second set of parts having resonance with the third intermediate data set using the resonance function.

3. The method of claim 2, further comprises:

repeating the identifying and combining steps until resonating parts in the first set of parts and resonating parts in the second set stop changing after the identifying and combining steps.

4. The method of claim 1, wherein the resonance function comprises identifying a sufficient number of keyword matches between two parts.

5. The method of claim 1, wherein the resonance function comprises identifying resonance between two parts based on one or more semantic rules.

6. The method of claim 1, wherein the resonance function comprises identifying resonance between two parts based on one or more logic rules, wherein the logic rules are provided on the basis of logical relationships found in at least one of: the first data set and the second data set.

7. The method of claim 1, further comprising at least one of:

generating at least some of the first set of parts from the first data set using horizontal search; and generating at least some of the second set of parts from the second data set using horizontal search.

8. The method of claim 1, further comprising at least one of:

generating at least some of the first set of parts from the first data set based on a first parameter provided by a user; and generating at least some of the second set of parts from the second data set based on a second parameter provided by the user.

9. The method of claim 1, further comprising at least one of:

generating, based on a first specified unit of data, at least some of the first set of parts from the first data set from a first remainder of data which does not fit into other parts of the first set of parts; and generating, based on a second specified unit of data, at least some of the second set of parts from the second data set from a second remainder of data which does not fit into other parts of the first set of parts.

10. The method of claim 1, further comprising at least one of:

generating at least some of the first set of parts from the first data set without breaking a first smallest allowable unit of data; and generating at least some of the second set of parts from the second data set without breaking a second smallest allowable unit of data.

11. The method of claim 1, further comprising at least one of:

generating at least some of the first set of parts from the first data set according to a first sensitivity parameter such that the at least some of the first set of parts are differentiated from each other according to a first pre-determined level of differentiation; and generating at least some of the second set of parts from the second data set according to a second sensitivity parameter such that the at least some of the second set of parts are differentiated from each other according to a second pre-determined level of differentiation.

12. The method of claim 1, wherein the resonance function is parameterizable based on a third parameter provided by a user for adjusting the sensitivity of the resonance function.

13. The method of claim 1, wherein the resonance function is parameterizable based on a fourth parameter not provided by a user for adjusting the sensitivity of the resonance function, wherein the fourth parameter is determinable based on a measurable difference(s) between the first data set and the second data set.

14. The method of claim 1, wherein the resonance function is parameterizable based on the number of times the identifying and combining steps are executed for adjusting the sensitivity of the resonance function.

15. The method of claim 1, further comprising:

identifying one or more sixth-resonating parts in the first set of parts having resonance with a third part of the second set of parts using the resonance function;

combining the one or more sixth-resonating parts in the first set into a fourth intermediate data set; and identifying one or more seventh-resonating parts in the second set of parts having resonance with the fourth intermediate data set using the resonance function.

16. The method of claim 1, further comprising at least one of:

generating at least some of the first set of parts from the first data set by combining one or more resonating parts identified by an instance of the method for normalizing comprehension, wherein label(s) attributed to the at least some of the first set of parts is derived from an intermediate data set or one or more parts with which the one or more resonating parts are identified; and generating at least some of the second set of parts from the second data set by combining one or more resonating parts identified by an instance of the method for normalizing comprehension, wherein label(s) attributed to the at least some of the second set of parts is derived from an intermediate data set or one or more parts with which the one or more resonating parts are identified.

17. A system for normalizing comprehension of at least one of a first data set and a second data set, the first data set comprising a first set of parts, and the second data set comprising a second set of parts, the system comprising, one or more processors, one or more memory elements, a comprehension normalization module, that when executed by the at least one processors is configured to:

identify one or more first-resonating parts in the second set of parts having resonance with a first part of the first set of parts using a resonance function;

combine the one or more first-resonating parts in the second set into a first intermediate data set;

identify one or more second-resonating parts in the first set of parts having resonance with the first intermediate data set using the resonance function;

identify one or more third-resonating parts in the second set of parts having resonance with a second part of the first set of parts using the resonance function;

combine the one or more third-resonating parts in the second set into a second intermediate data set; and identify one or more fourth-resonating parts in the first set of parts having resonance with the second intermediate data set using the resonance function.

18. The system of claim 17, wherein the comprehension normalization module is further configured to:
  combine the one or more second-resonating parts in the first set of parts into a third intermediate data set; and
  identify one or more fifth-resonating parts in the second set of parts having resonance with the third intermediate data set using the resonance function.

19. The system of claim 18, wherein the comprehension normalization module is further configured to:
  repeat the identifying and combining steps until resonating parts in the first set of parts and resonating parts in the second set stop changing after the identifying and combining steps.

20. The system of claim 17, wherein the resonance function comprises identifying a sufficient number of keyword matches between two parts.

21. The system of claim 17, wherein the resonance function comprises identifying resonance between two parts based on one or more semantic rules.

22. The system of claim 17, wherein the resonance function comprises identifying resonance between two parts based on one or more logic rules, wherein the logic rules are provided on the basis of logical relationships found in at least one of: the first data set and the second data set.

23. The system of claim 17, wherein the comprehension normalization module is further configured to perform at least one of the following:
  generating at least some of the first set of parts from the first data set using horizontal search; and
  generating at least some of the second set of parts from the second data set using horizontal search.

24. The system of claim 17, wherein the comprehension normalization module is further configured to perform at least one of the following:
  generating at least some of the first set of parts from the first data set based on a first parameter provided by a user; and
  generating at least some of the second set of parts from the second data set based on a second parameter provided by the user.

25. The system of claim 17, wherein the comprehension normalization module is further configured to perform at least one of the following:
  generating, based on a first specified unit of data, at least some of the first set of parts from the first data set from a first remainder of data which does not fit into other parts of the first set of parts; and
  generating, based on a second specified unit of data, at least some of the second set of parts from the second data set from a second remainder of data which does not fit into other parts of the first set of parts.

26. The system of claim 17, wherein the comprehension normalization module is further configured to perform at least one of the following:
  generating at least some of the first set of parts from the first data set without breaking a first smallest allowable unit of data; and
  generating at least some of the second set of parts from the second data set without breaking a second smallest allowable unit of data.

27. The system of claim 17, wherein the comprehension normalization module is further configured to perform at least one of the following:
  generating at least some of the first set of parts from the first data set according to a first sensitivity parameter such that the at least some of the first set of parts are differentiated from each other according to a first pre-determined level of differentiation; and
  generating at least some of the second set of parts from the second data set according to a second sensitivity parameter such that the at least some of the second set of parts are differentiated from each other according to a second pre-determined level of differentiation.

28. The system of claim 17, wherein the resonance function is parameterizable based on a third parameter provided by a user for adjusting the sensitivity of the resonance function.

29. The system of claim 17, wherein the resonance function is parameterizable based on a fourth parameter not provided by a user for adjusting the sensitivity of the resonance function, wherein the fourth parameter is determinable based on a measurable difference(s) between the first data set and the second data set.

30. The system of claim 17, wherein the resonance function is parameterizable based on the number of times the identifying and combining steps are executed for adjusting the sensitivity of the resonance function.

31. The system of claim 17, wherein the comprehension normalization module is further configured to:
  identify one or more sixth-resonating parts in the first set of parts having resonance with a third part of the second set of parts using the resonance function;
  combine the one or more sixth-resonating parts in the first set into a fourth intermediate data set; and
  identify one or more seventh-resonating parts in the second set of parts having resonance with the fourth intermediate data set using the resonance function.

32. The system of claim 17, wherein the comprehension normalization module is further configured to perform at least one of the following:
  generating at least some of the first set of parts from the first data set by combining one or more resonating parts identified by an instance of the method for normalizing comprehension, wherein label(s) attributed to the at least some of the first set of parts is derived from an intermediate data set or one or more parts with which the one or more resonating parts are identified; and
  generating at least some of the second set of parts from the second data set by combining one or more resonating parts identified by an instance of the method for normalizing comprehension, wherein label(s) attributed to the at least some of the second set of parts is derived from an intermediate data set or one or more parts with which the one or more resonating parts are identified.

33. At least one machine readable non-transitory storage medium having instructions stored thereon, wherein the instructions when executed by at least one processors cause the at least one processors to perform the following operations for normalizing comprehension of a first data set and a second data set, the first data set comprising a first set of parts, and the second data set comprising a second set of parts, the operations comprising:
  identifying one or more first-resonating parts in the second set of parts having resonance with a first part of the first set of parts using a resonance function;
  combining the one or more first-resonating parts in the second set into a first intermediate data set;
  identifying one or more second-resonating parts in the first set of parts having resonance with the first intermediate data set using the resonance function;
  identifying one or more third-resonating parts in the second set of parts having resonance with a second part of the first set of parts using the resonance function;

combining the one or more third-resonating parts in the second set into a second intermediate data set; and
identifying one or more fourth-resonating parts in the first set of parts having resonance with the second intermediate data set using the resonance function.

34. The at least one machine readable non-transitory storage medium of claim 33, wherein the operations further comprises:
combining the one or more second-resonating parts in the first set of parts into a third intermediate data set; and
identifying one or more fifth-resonating parts in the second set of parts having resonance with the third intermediate data set using the resonance function.

35. The at least one machine readable non-transitory storage medium of claim 34, wherein the operations further comprises:
repeating the identifying and combining steps until resonating parts in the first set of parts and resonating parts in the second set stop changing after the identifying and combining steps.

36. The at least one machine readable non-transitory storage medium of claim 33, wherein the resonance function comprises identifying a sufficient number of keyword matches between two parts.

37. The at least one machine readable non-transitory storage medium of claim 33, wherein the resonance function comprises identifying resonance between two parts based on one or more semantic rules.

38. The at least one machine readable non-transitory storage medium of claim 33, wherein the resonance function comprises identifying resonance between two parts based on one or more logic rules, wherein the logic rules are provided on the basis of logical relationships found in at least one of: the first data set and the second data set.

39. The at least one machine readable non-transitory storage medium of claim 33, wherein the operations further comprises at least one of:
generating at least some of the first set of parts from the first data set using horizontal search; and
generating at least some of the second set of parts from the second data set using horizontal search.

40. The at least one machine readable non-transitory storage medium of claim 33, wherein the operations further comprises at least one of:
generating at least some of the first set of parts from the first data set based on a first parameter provided by a user; and
generating at least some of the second set of parts from the second data set based on a second parameter provided by the user.

41. The at least one machine readable non-transitory storage medium of claim 33, wherein the operations further comprises at least one of:
generating, based on a first specified unit of data, at least some of the first set of parts from the first data set from a first remainder of data which does not fit into other parts of the first set of parts; and
generating, based on a second specified unit of data, at least some of the second set of parts from the second data set from a second remainder of data which does not fit into other parts of the first set of parts.

42. The at least one machine readable non-transitory storage medium of claim 33, wherein the operations further comprises at least one of:
generating at least some of the first set of parts from the first data set without breaking a first smallest allowable unit of data; and
generating at least some of the second set of parts from the second data set without breaking a second smallest allowable unit of data.

43. The at least one machine readable non-transitory storage medium of claim 33, wherein the operations further comprises at least one of:
generating at least some of the first set of parts from the first data set according to a first sensitivity parameter such that the at least some of the first set of parts are differentiated from each other according to a first pre-determined level of differentiation; and
generating at least some of the second set of parts from the second data set according to a second sensitivity parameter such that the at least some of the second set of parts are differentiated from each other according to a second pre-determined level of differentiation.

44. The at least one machine readable non-transitory storage medium of claim 33, wherein the resonance function is parameterizable based on a third parameter provided by a user for adjusting the sensitivity of the resonance function.

45. The at least one machine readable non-transitory storage medium of claim 33, wherein the resonance function is parameterizable based on a fourth parameter not provided by a user for adjusting the sensitivity of the resonance function, wherein the fourth parameter is determinable based on a measurable difference(s) between the first data set and the second data set.

46. The at least one machine readable non-transitory storage medium of claim 33, wherein the resonance function is parameterizable based on the number of times the identifying and combining steps are executed for adjusting the sensitivity of the resonance function.

47. The at least one machine readable non-transitory storage medium of claim 33, wherein the operations further comprises:
identifying one or more sixth-resonating parts in the first set of parts having resonance with a third part of the second set of parts using the resonance function;
combining the one or more sixth-resonating parts in the first set into a fourth intermediate data set; and
identifying one or more seventh-resonating parts in the second set of parts having resonance with the fourth intermediate data set using the resonance function.

48. The at least one machine readable non-transitory storage medium of claim 33, wherein the operations further comprises at least one of:
generating at least some of the first set of parts from the first data set by combining one or more resonating parts identified by an instance of the method for normalizing comprehension, wherein label(s) attributed to the at least some of the first set of parts is derived from an intermediate data set or one or more parts with which the one or more resonating parts are identified; and
generating at least some of the second set of parts from the second data set by combining one or more resonating parts identified by an instance of the method for normalizing comprehension, wherein label(s) attributed to the at least some of the second set of parts is derived from an intermediate data set or one or more parts with which the one or more resonating parts are identified.

* * * * *